United States Patent
Fukazawa et al.

(10) Patent No.: US 11,110,899 B2
(45) Date of Patent: Sep. 7, 2021

(54) VEHICLE AND CLEANING METHOD OF DETECTION SENSOR MOUNTED ON VEHICLE

(71) Applicant: TOYOTA JIDOSHA KABUSHIKI KAISHA, Toyota (JP)

(72) Inventors: Kazuhiro Fukazawa, Miyoshi (JP); Tsutomu Onagi, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 196 days.

(21) Appl. No.: 16/514,369

(22) Filed: Jul. 17, 2019

(65) Prior Publication Data
US 2020/0062222 A1   Feb. 27, 2020

(30) Foreign Application Priority Data
Aug. 24, 2018 (JP) .............................. JP2018-157188

(51) Int. Cl.
| B60S 1/50 | (2006.01) |
| H01M 8/04119 | (2016.01) |
| H01M 8/04111 | (2016.01) |
| B60S 1/52 | (2006.01) |
| H01M 8/04701 | (2016.01) |

(52) U.S. Cl.
CPC . *B60S 1/50* (2013.01); *B60S 1/52* (2013.01); *H01M 8/04111* (2013.01); *H01M 8/04156* (2013.01); *H01M 8/04716* (2013.01); *B60Y 2400/202* (2013.01); *H01M 2250/20* (2013.01)

(58) Field of Classification Search
CPC ......... H01M 8/04156; H01M 8/04716; H01M 8/04111; H01M 2250/20; B60S 1/50; B60S 1/52; B60S 1/56; Y02E 60/50; Y02T 90/40; B60Y 2400/202
See application file for complete search history.

(56) References Cited

U.S. PATENT DOCUMENTS

2009/0250533 A1   10/2009   Akiyama et al.

FOREIGN PATENT DOCUMENTS

| JP | 2003-320866 A | | 11/2003 |
| JP | 2004-182080 A | | 7/2004 |
| JP | 2005-108529 | * | 4/2005 |
| JP | 2005-108529 A | | 4/2005 |
| JP | 2006-318827 A | | 11/2006 |
| JP | 2008-060874 A | | 3/2008 |
| JP | 2009-248661 A | | 10/2009 |
| JP | 2016-009099 | * | 1/2016 |
| JP | 2016-009099 A | | 1/2016 |

* cited by examiner

*Primary Examiner* — Brittany L Raymond
(74) *Attorney, Agent, or Firm* — Sughrue Mion, PLLC

(57) ABSTRACT

There is provided a vehicle including a detection sensor used to detect a surrounding condition of the vehicle; a vehicle controller configured to perform drive control of the vehicle by using a signal output from the detection sensor; a fuel cell configured to generate electric power while generating water; an accumulating portion configured to accumulate the generated water discharged from the fuel cell therein as liquid water; and a cleaning portion connected with the accumulating portion, provided with a nozzle that is open to the detection sensor, and configured to eject the liquid water accumulated in the accumulating portion through the nozzle and thereby clean the detection sensor under control of the vehicle controller.

7 Claims, 12 Drawing Sheets

VEHICLE AND CLEANING METHOD OF DETECTION SENSOR MOUNTED ON VEHICLE

CROSS REFERENCE TO RELATED APPLICATIONS

The present application claims priority from Japanese patent application 2018-157188 filed on Aug. 24, 2018, the disclosure of which is hereby incorporated by reference in its entirety.

BACKGROUND

Field

The present disclosure relates to a vehicle and a cleaning method of a detection sensor mounted on a vehicle.

Related Art

A vehicle may be provided with various detection sensors used to detect surrounding conditions of the vehicle, for example, a camera and a radar. The detection accuracy of such a detection sensor is likely to be decreased by dirt caused by, for example, adhesion of a foreign substance. A technique of cleaning the detection sensors has conventionally been proposed. For example, JP 2009-248661A discloses a vehicle configured to clean a lens of an in-vehicle camera by using a washer liquid for cleaning rear window.

In the configuration of cleaning the detection sensor by using only the washer liquid stored in advance in the vehicle as the cleaning liquid as described in JP 2009-248661A, however, the washer liquid is likely to become insufficient during drive of the vehicle and result in insufficient cleaning of the detection sensor. Especially when the detection sensors are continuously used for drive control of automatic drive including drive assistance during drive of the vehicle, the higher frequency of cleaning of the detection sensors is desirable. This increases the possibility of insufficiency of the washer liquid. When cleaning of the detection sensors is performed automatically, the driver is more likely to start driving the vehicle without recognizing the insufficiency of the washer liquid. This increases the possibility of insufficiency of the washer liquid during drive of the vehicle. In the vehicle equipped with detection sensors, there is accordingly a demand for sufficiently cleaning the detection sensors.

SUMMARY

The present disclosure may be implemented by aspects described below.

According to a first aspect, there is provided a vehicle. The vehicle of this aspect comprises a detection sensor used to detect a surrounding condition of the vehicle; a vehicle controller configured to perform drive control of the vehicle by using a signal output from the detection sensor; a fuel cell configured to generate electric power while generating water; an accumulating portion configured to accumulate the generated water discharged from the fuel cell therein as liquid water; and a cleaning portion connected with the accumulating portion, provided with a nozzle that is open to the detection sensor, and configured to eject the liquid water accumulated in the accumulating portion through the nozzle and thereby clean the detection sensor under control of the vehicle controller.

DETAILED DESCRIPTION

1. First Embodiment

Figure 1:
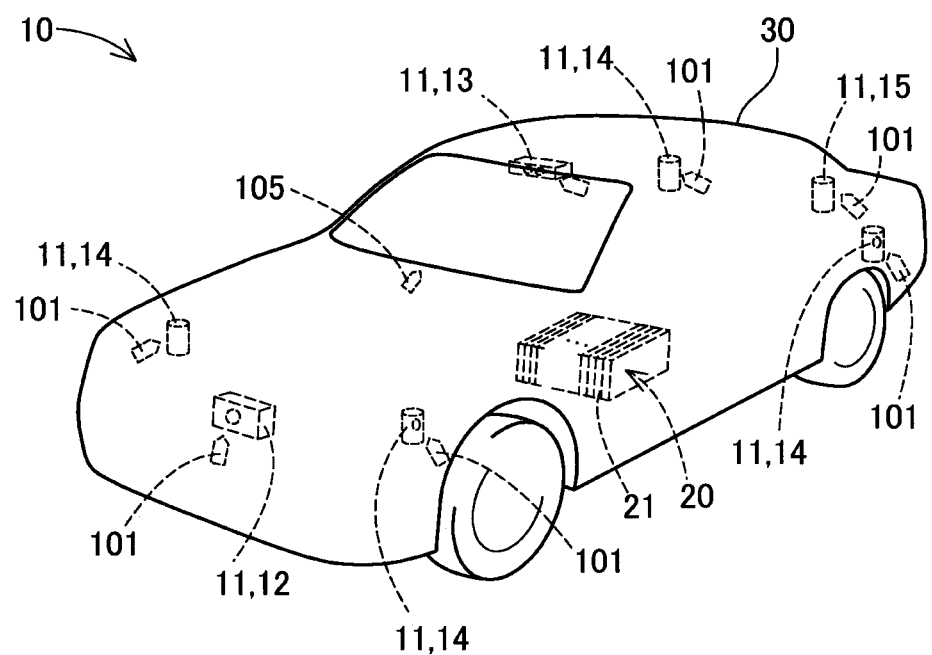
FIG. 1 is a schematic perspective view illustrating a vehicle according to a first embodiment.

FIG. 1 is a schematic perspective view illustrating a vehicle 10 according to a first embodiment. The vehicle 10 is equipped with detection sensors 11 used to detect the surrounding conditions. The vehicle 10 uses output signals of the detection sensors 11 for drive control thereof as described below. The positions of the detection sensors 11 are shown by the broken line in FIG. 1 as a matter of convenience. Each of the detection sensors 11 is continuously driven after a start of the vehicle 10 by the driver.

According to the first embodiment, the vehicle 10 includes a first front sensor 12, a second front sensor 13, four side sensors 14 and a rear sensor 15 as the detection sensors 11. The first front sensor 12 is mounted in a front end portion of the vehicle 10. The first front sensor 12 may be mounted to, for example, a front bumper or a front grill of the vehicle 10. The second front sensor 13 is mounted in an upper end portion of a front window. The side sensors 14 are respectively mounted on left and right sides in a front portion and on left and right sides in a rear portion of the vehicle 10. The side sensors 14 in the front portion of the vehicle 10 may be mounted, for example, in side end portions in a width direction of the front bumper or in the vicinity of front fenders. The side sensors 14 in the rear portion of the vehicle 10 may be mounted, for example, in side end portions in the width direction of a rear bumper or in the vicinity of rear fenders. The rear sensor 15 is mounted in a rear end portion of the vehicle 10. The rear sensor 15 may be mounted to, for example, the rear bumper or a rear gate.

Each of the detection sensors 11 is configured to receive physical waves or transmit and receive physical waves and thereby detect an object that is present in the surrounding of the vehicle 10. Each of the first front sensor 12, the side sensors 14 and the rear sensor 15 may be configured by, for example, a LIDAR (light detecting and ranging), a radar such as a millimeter wave radar, or a sonar that transmits and receive physical waves. The second front sensor 13 may be configured by, for example, a camera that receives physical waves. According to another embodiment, the vehicle 10 may not be necessarily equipped with all the sensors 12, 13, 14 and 15 described above as the detection sensors 11. The vehicle 10 should be equipped with at least one detection sensor 11. The positions where the detection sensors 11 are placed in the vehicle 10 are not limited to the positions illustrated in FIG. 1.

The vehicle 10 is further equipped with a fuel cell 20. The fuel cell 20 is illustrated by the broken line in FIG. 1 as a matter of convenience. The fuel cell 20 is a solid electrolyte fuel cell that generates electric power by an electrochemical reaction of supplied reactive gases. According to the first embodiment, the reactive gases are hydrogen as a fuel gas and oxygen as an oxidizing gas. The fuel cell 20 has a stack structure formed by stacking a plurality of unit cells 21 as power generation elements that are individually capable of generating electric power alone. Each unit cell 21 has a membrane electrode assembly as a power generation body formed by placing electrodes on respective surfaces of an electrolyte membrane, and two separators placed across the membrane electrode assembly. The electrolyte membrane is configured by a solid polymer thin film having good proton conductivity in a wet state that the electrolyte membrane contains water inside thereof.

According to the first embodiment, the vehicle 10 uses the electric power generated by the fuel cell 20 as a driving force. The electric power generated by the fuel cell 20 may be used as power supply to various electric components and auxiliary machines mounted on the vehicle 10 and an external load that is electrically connected with the vehicle 10 by means of a plug or the like. According to another embodiment, the vehicle 10 may not necessarily use the electric power generated by the fuel cell 20 as the driving force. The fuel cell 20 may be mounted on the vehicle 10, for example, as an auxiliary power source.

In the fuel cell 20, water is generated on a cathode by the electrochemical reaction during power generation. The generated water is discharged in the form of liquid water or steam from the fuel cell 20. In the vehicle 10, as described later, the water generated in the fuel cell 20 is used to clean the detection sensors 11 described above.

Figure 2:
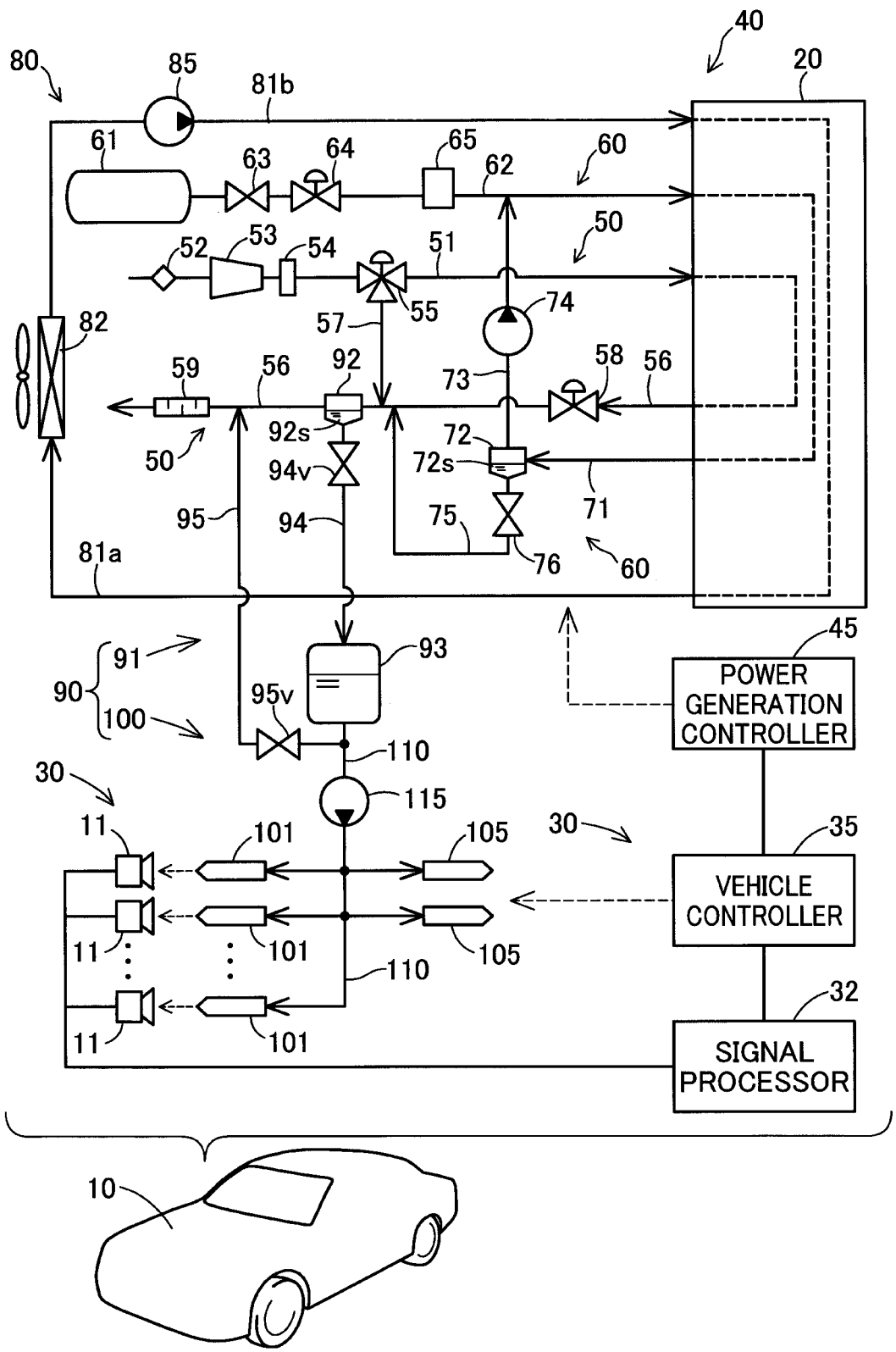
FIG. 2 is a schematic diagram illustrating the system configuration of the vehicle according to the first embodiment.

FIG. 2 is a schematic diagram illustrating the system configuration of the vehicle 10. The vehicle 10 includes a drive control system 30 configured to control the vehicle 10, a fuel cell system 40 configured to control the power generation of the fuel cell 20, and a cleaning system 90 configured to clean the detection sensors 11.

The drive control system 30 includes the detection sensors 11 described above, a signal processor 32 configured to process output signals of the detections sensors 11 and a vehicle controller 35 configured to perform drive control of the vehicle 10 by using the output signals of the detection sensors 11. The signal processor 32 uses the output signals of the detection sensors 11 to generate image data representing the conditions in the periphery of the vehicle 10 and outputs the generated image data to the vehicle controller 35.

The vehicle controller 35 is configured by an ECU (electronic control unit) including one or a plurality of central processing units (CPU) and a main storage unit. The vehicle controller 35 executes commands and programs loaded on the main storage unit by the CPU, such as to achieve various functions for performing drive control of the vehicle 10.

The vehicle controller 35 performs drive control that analyzes the image data obtained from the signal processor 32 and controls driving of the vehicle 10. In the drive control, the vehicle controller 35 controls a motor that is a driving portion of the vehicle 10, a braking system of the vehicle 10 and a steering gear of the vehicle 10. When the vehicle 10 is equipped with an internal combustion engine that generates the driving force of the vehicle 10 in addition to the motor or in place of the motor, the drive controller 35 also controls the internal combustion engine.

According to the first embodiment, the drive control performed by the vehicle controller 35 includes drive assist control to assist the driver's manual driving operations and automatic drive control to automatically control driving of the vehicle 10 without the driver's driving operations. According to another embodiment, the vehicle controller 35 may perform drive control that is only one of the drive assist control and the automatic drive control.

The vehicle controller 35 calculates a required electric power for the drive control and gives a request to a power generation controller 45 of the fuel cell system 40 to generate the required electric power. The vehicle controller 35 also serves as a controller of the cleaning system 90 to control a process of cleaning the detection sensors 11 by the cleaning system 90 as described later.

The fuel cell system 40 includes the power generation controller 45 configured to control the fuel cell system 40, in addition to the fuel cell 20 described above. The fuel cell system 40 also includes an oxidizing gas supply discharge system 50 and a fuel gas supply discharge system 60 as suppliers to supply the reactive gases to the fuel cell 20. The fuel cell system 40 further includes a cooling medium circulation system 80 configured to control the temperature of the fuel cell 20 by using a cooling medium.

The power generation controller 45 is configured by an ECU (electronic control unit) including one or a plurality of central processing units (CPU) and a main storage unit. The power generation controller 45 executes programs loaded on the main storage unit by the CPU, such as to achieve various functions for controlling power generation of the fuel cell 20. The power generation controller 45 controls the respective components of the fuel cell system 40 and causes the fuel cell 20 to generate electric power corresponding to an output request from the vehicle controller 35.

The oxidizing gas supply discharge system 50 serves to supply the oxidizing gas to a cathode of the fuel cell 20 and to lead exhaust gas discharged from the cathode of the fuel cell 20 to outside of the vehicle 10. According to the first embodiment, the oxidizing gas is oxygen included in the air that is taken into the vehicle 10 through the front grill of the vehicle 10.

The oxidizing gas supply discharge system 50 includes a cathode gas piping 51 connected with a cathode inlet of the fuel cell 20, a cathode off-gas piping 56 connected with a cathode outlet, and a bypass piping 57 arranged to connect the cathode gas piping 51 with the cathode off-gas piping 56. The oxidizing gas supply discharge system 50 also includes an air cleaner 52, a compressor 53, an intercooler 54, and a flow dividing valve 55. The air cleaner 52, the compressor 53, the intercooler 54 and the flow dividing valve 55 are provided in the cathode gas piping 51 in this sequence from an upstream side. The oxidizing gas supply discharge system 50 further includes a pressure regulator 58 and a muffler 59. The pressure regulator 58 and the muffler 59 are provided in the cathode off-gas piping 56. A gas liquid separator 92 that is included in a collecting portion 91 of the cleaning system 90 as described later is provided between the pressure regulator 58 and the muffler 59 in the cathode off-gas piping 56.

The oxidizing gas flows through the cathode gas piping 51, as the reactive gas that is to be supplied to the fuel cell 20. The air taken in through an air intake, which is not shown in the figures, is flowed into an upstream end of the cathode gas piping 51. The air cleaner 52 is configured to clean the intake air. The compressor 53 is configured to feed a compressed gas obtained by compressing the air cleaned by the air cleaner 52, to the cathode gas piping 51. The cathode gas piping 51 is one of gas pipings which the compressed gas fed by the compressor 53 flows in. An air flowmeter may be provided on an upstream side of the compressor 53 to measure the amount of the air flowing into the compressor 53. The intercooler 54 is configured to decrease the temperature of the air that is increased during compression of the air by the compressor 53.

The flow dividing valve 55 is configured by a three-way valve. One of ports of the flow dividing valve 55 is connected with the cathode off-gas piping 56 via the bypass piping 57. The flow of the air cooled down by the intercooler 54 is divided by the flow dividing valve 55 into the fuel cell 20-side and the cathode off-gas piping 56-side. The bypass piping 57 is one of gas pipings which the compressed gas fed by the compressor 53 flows in. The power generation controller 45 controls the opening position of the flow dividing valve 55 to change the flow rate of the divisional flow of the air into the bypass piping 57 and thereby regulate the pressure of the air that is to be supplied to the cathode of the fuel cell 20. An on-off valve may be provided between the flow dividing valve 55 and the fuel cell 20 and may be opened by the air that has a higher pressure than a predetermined pressure.

The cathode off-gas piping 56 is arranged to lead a cathode off-gas discharged from the cathode of the fuel cell 20 to outside of the vehicle 10. The cathode off-gas includes the oxidizing gas that is not consumed at the cathode of the fuel cell 20, an inert gas and water that is present on the cathode side of the fuel cell 20. The pressure regulator 58 is configured to control the internal pressure of the cathode off-gas piping 56, i.e., the back pressure on the cathode side of the fuel cell 20. The bypass piping 57 described above is connected between the pressure regulator 58 and the gas liquid separator 92. According to another embodiment, the bypass piping 57 may be connected between the gas liquid separator 92 and the muffler 59. The muffler 59 is configured to regulate the exhaust sound in the cathode off-gas piping 56.

The fuel gas supply discharge system 60 serves to supply the fuel gas to the fuel cell 20, to lead water discharged from an anode of the fuel cell 20 to outside of the vehicle 10, and to circulate an anode off-gas to the fuel cell 20. The anode off-gas includes the fuel gas that is not consumed at the anode of the fuel cell 20, an inert gas and water that is present on the anode side of the fuel cell 20.

The fuel gas supply discharge system 60 includes a high pressure tank 61 filled with high-pressure hydrogen as the fuel gas and an anode gas piping 62 arranged to connect the high pressure tank 61 with an anode inlet of the fuel cell 20. The fuel gas supply discharge system 60 also includes an on-off valve 63, a regulator 64 and a gas supply device 65. The on-off valve 63, the regulator 64 and the gas supply device 65 are provided in the anode gas piping 62 in this sequence from an upstream side.

The on-off valve 63 is configured to control the flow of the fuel gas from the high pressure tank 61 to the gas supply device 65. The regulator 64 is a pressure reducing valve configured to regulate the pressure of the fuel gas on an upstream side of the gas supply device 65. The gas supply device may be configured by, for example, an injector that is an electromagnetically-driven on-off-valve. The power generation controller 45 controls a driving cycle that represents an open-close timing of the gas supply device 65 and thereby controls the supply amount of the fuel gas to the fuel cell 20.

The fuel gas supply discharge system 60 also includes an anode off-gas piping 71, a gas liquid separator 72, a circulation piping 73, a circulation pump 74, a drain piping 75 and a drain valve 76. The anode off-gas piping 71 is arranged to connect an anode outlet of the fuel cell 20 with the gas liquid separator 72. The anode off-gas piping 71 serves to lead the anode off-gas to the gas liquid separator 72.

The gas liquid separator 72 is configured by a container having a water accumulating portion $72s$ that accumulates the liquid water therein. The gas liquid separator 72 is connected with the anode off-gas piping 71 and with the circulation piping 73 in a portion above the water accumulating portion $72s$ in the direction of gravity and is connected with the drain piping 75 in the water accumulating portion $72s$. The gas liquid separator 72 is configured to separate a liquid component including the generated water from the anode off-gas led through the anode off-gas piping 71 and to accumulate the liquid component in the water accumulating portion $72s$ in the state of liquid water.

A gas component of the anode off-gas including the fuel gas that is not used for power generation at the anode is flowed from the gas liquid separator 72 to the circulation piping 73. The circulation piping 73 is connected with the anode gas piping 62 on a downstream side of the gas supply device 65. The circulation piping 73 is provided with the circulation pump 74. The circulation pump 74 is configured to circulate the gas component separated by the gas liquid separator 72 to the anode of the fuel cell 20 through the anode gas piping 62.

The drain piping 75 is connected with the cathode off-gas piping 56. The drain piping 75 is provided with the drain valve 76. The drain valve 76 is opened and closed under control of the power generation controller 45 to control discharge of the liquid water from the water accumulating portion $72s$ of the gas liquid separator 72. The power generation controller 45 normally closes the drain valve 76 and opens the drain valve 76 at a predetermined timing. When the drain valve 76 is opened, the liquid water accumulated in the water accumulating portion $72s$ of the gas liquid separator 72 is led out to the cathode off-gas piping 56. According to the first embodiment, the drain piping 75 is connected with the cathode off-gas piping 56 on an upstream side of the gas liquid separator 92. The liquid water discharged from the gas liquid separator 72 is led through the gas liquid separator 92 provided in the cathode off-gas piping 56 to the cleaning system 90. According to another embodiment, the drain piping 75 may be directly connected with the gas liquid separator 92 or may be directly connected with a collecting piping 94 or an accumulating portion 93 included in the cleaning system 90 described later.

The cooling medium circulation system 80 includes an upstream-side piping $81a$ and a downstream-side piping $81b$ that are pipings for a cooling medium, a radiator 82, and a cooling medium pump 85. The upstream-side piping $81a$ is arranged to connect an outlet of a cooling medium flow path in the fuel cell 20 with an inlet of the radiator 82. The downstream-side piping 81b is arranged to connect an inlet of the cooling medium flow path in the fuel cell 20 with an outlet of the radiator 82. The cooling medium pump 85 is provided in the downstream-side piping 81b and is driven under control of the power generation controller 45 to circulate the cooling medium between the radiator 82 and the fuel cell 20. The cooling medium is cooled down by heat exchange with the outside air in the radiator 82.

The fuel cell system 40 additionally includes a secondary battery and a DC-DC converter, although not being illustrated. The secondary battery is configured to accumulate electric power output from the fuel cell 20 and regenerative electric power and serves, in combination with the fuel cell 20, as an electric power source of the vehicle 10. The DC-DC converter is configured to control charging and discharging of the secondary battery and the output voltage of the fuel cell 20 under control of the power generation controller 45.

The cleaning system 90 includes a collecting portion 91 configured to collect the water generated in the fuel cell 20 and a cleaning portion 100 configured to clean the detection sensors 11 with the collected generated water. The collecting portion 91 includes the gas liquid separator 92 mounted to the cathode off-gas piping 56 described above, an accumulating portion 93 configured by a container to accumulate the liquid water therein, a collecting piping 94 arranged to connect the gas liquid separator 92 with the accumulating portion 93, and an on-off valve 94v configured to control opening and closing of the collecting piping 94.

The gas liquid separator 92 is configured by a container having a water accumulating portion 92s that accumulates the liquid water therein. The gas liquid separator 92 is connected with the cathode off-gas piping 56 in a portion above the water accumulating portion 92s in the direction of gravity and is connected with the collecting piping 94 in the water accumulating portion 92s. The gas liquid separator 92 is configured to separate a liquid component including the generated water from an off-gas led through the cathode off-gas piping 56 and to accumulate the liquid component in the water accumulating portion 92s in the state of liquid water.

According to the first embodiment, the off gas led into the gas liquid separator 92 includes the cathode off-gas discharged from the cathode of the fuel cell 20 and the anode off-gas flowed through the drain piping 75 of the fuel gas supply discharge system 60 into the cathode off-gas piping 56. This anode off-gas includes the fuel gas that is not used for power generation in the fuel cell 20 and an inert gas. According to the first embodiment, the water accumulating portion 92s of the gas liquid separator 92 accumulates therein liquid water discharge from the gas liquid separator 72 of the fuel gas supply discharge system 60 to the cathode off-gas piping 56, in addition to the liquid water separated from the off-gas as described above.

The vehicle controller 35 normally closes the on-off valve 94v of the collecting piping 94 and opens the on-off valve 94v at a predetermined timing. When the on-off valve 94v is opened, the liquid water accumulated in the water accumulating portion 92s of the gas liquid separator 92 is flowed through the collecting piping 94 to the accumulating portion 93. The water generated in the fuel cell 20 is accordingly accumulated in the accumulating portion 93 in the state of liquid water. This process of accumulating water generated in and discharged from the fuel cell 20 is performed in the vehicle 10 during operation of the fuel cell 20.

When the amount of the generated water accumulated in the accumulating portion 93 exceeds the capacity of the accumulating portion 93, the vehicle controller 35 keeps the on-off valve 94v closed and prohibits the flow of the generated water from the gas liquid separator 92 to the accumulating portion 93, irrespective of the valve-open timing described above. The vehicle controller 35 may use a sensor provided in the accumulating portion 93 to detect the amount of the generated water accumulated in the accumulating portion 93 or may calculate the amount of the generated water accumulated in the accumulating portion 93, based on the amount of power generation by the fuel cell 20 and a record of a time period when the generated water has been led to the accumulating portion 93. According to another embodiment, the vehicle controller 35 may normally keep the on-off valve 94v open and may perform control to close the on-off valve 94v when the amount of the generated water in the accumulating portion 93 exceeds the capacity of the accumulating portion 93.

The collecting portion 91 further includes a discharge piping 95 arranged to connect the gas liquid separator 92 with the cathode off-gas piping 56, and an on-off valve 95v provided in the discharge piping 95. According to the first embodiment, the discharge piping 95 is connected with the gas liquid separator 92 through a supply piping 110 included in the cleaning portion 100 described later. According to another embodiment, the discharge piping 95 may be connected directly with the accumulating portion 93. The on-off valve 95v is provided in the discharge piping 95 to control the flow of the generated water in the discharge piping 95.

The vehicle controller 35 normally closes the on-off valve 95v to prohibit the flow of the generated water into the discharge piping 95 and allow the generated water to be supplied through the supply piping 110 to the cleaning portion 100. For example, in the case where the accumulated amount of the generated water in the accumulating portion 93 is expected to exceed the capacity of the accumulating portion 93, the vehicle controller 35 opens the on-off valve 95v to cause the generated water to be flowed out through the discharge piping 95 to the cathode off-gas piping 56. According to the first embodiment, the discharge piping 95 and the on-off valve 95v may be omitted.

The cleaning portion 100 performs cleaning of the detection sensors 11 under control of the vehicle controller 35. According to the first embodiment, the cleaning portion 100 also cleans the windows of the vehicle 10. The cleaning portion 100 includes a plurality of nozzles 101 for the detection sensors 11 and window nozzles 105 used to clean the front window and the rear window of the vehicle 10. The cleaning portion 100 also includes the supply piping 110 arranged to connect the accumulating portion 93 with the respective nozzles 101 and 105, and a pressure pump 115 provided in the supply piping 110.

According to the first embodiment, the nozzles 101 are provided in one-to-one correspondence to the respective detection sensors 11 of the vehicle 10. As shown in FIG. 1, each of the nozzles 101 is placed such that a nozzle hole which liquid water is ejected from is open to the corresponding detection sensor 11. An on-off valve is built in each of the nozzles 101. The on-off valve of the nozzle 101 is opened and closed under control of the vehicle controller 35. The on-off valve of the nozzle 101 is normally closed and is opened in response to a valve-opening command from the vehicle controller 35. A process of using the nozzle 101 to clean the detection sensor 11 performed by the vehicle controller 35 will be described later.

According to another embodiment, the nozzle 101 may be provided for only part of the detection sensors 11. The vehicle 10 may be equipped with only one nozzle 101.

According to another embodiment, a plurality of nozzles 101 may be provided for one detection sensor 11.

The window nozzles 105 are provided respectively below the front window and above the rear window in the vehicle 10. The window nozzle 105 provided below the front window is illustrated by the broken line in FIG. 1. An on-off valve is built in each of the window nozzles 105. The on-off valve of the window nozzle 105 is opened and closed under control of the vehicle controller 35. The on-off valve of the window nozzle 105 is normally closed and is opened in response to a valve-opening command from the vehicle controller 35. The vehicle controller 35 opens the on-off valve of each of the window nozzles 105 in response to the driver's operation as a trigger and causes liquid water to be ejected from the window nozzle 105 toward the front window or toward the rear window.

The pressure pump 115 is configured to generate a predetermined pressure in the supply piping 110 under control of the vehicle controller 35. When the on-off valve of each of the nozzles 101 and 105 is opened in response to a command from the vehicle controller 35, this pressure causes the generated water in the supply piping 110 to be ejected from each of the nozzles 101 and 105.

Figure 3:
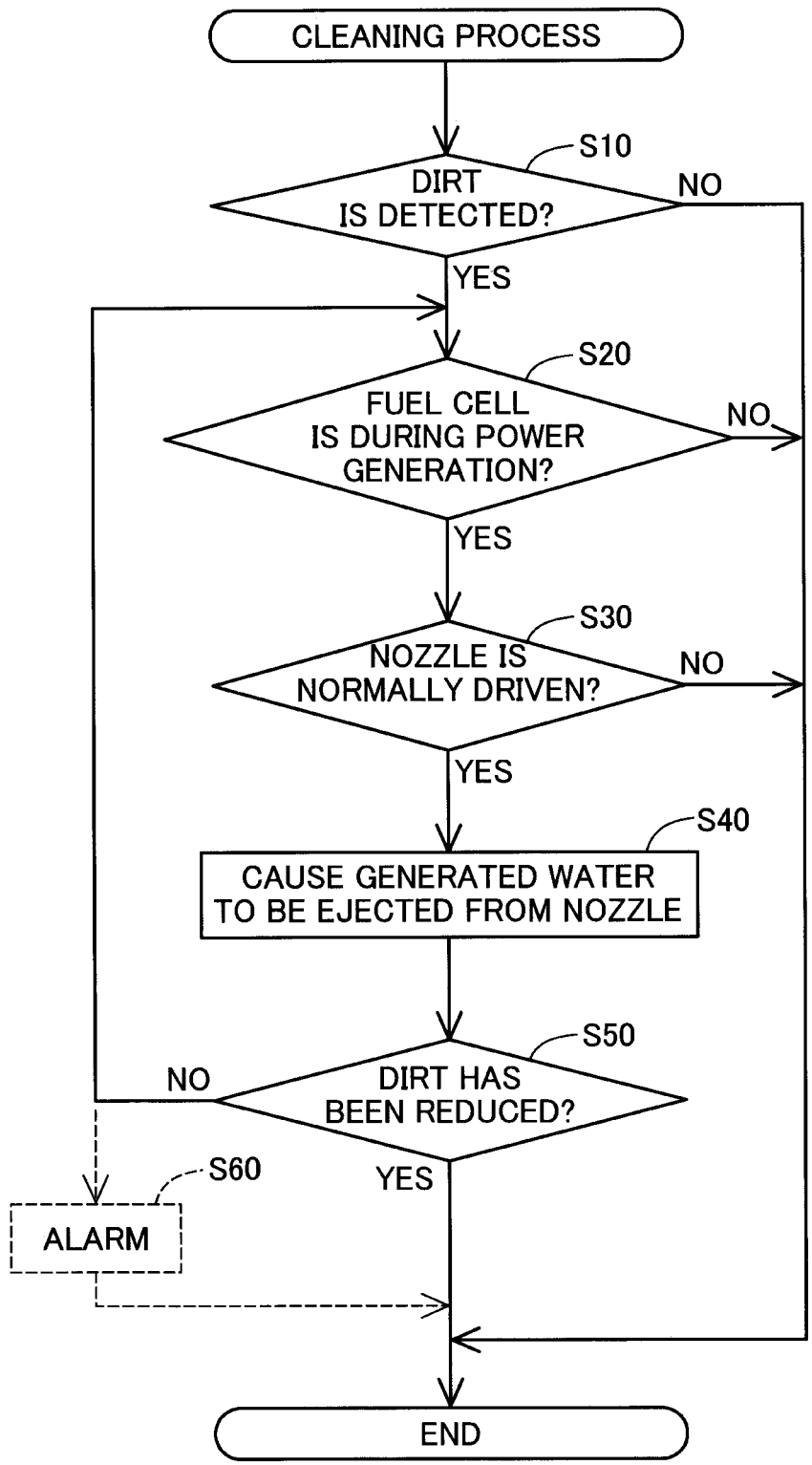
FIG. 3 is a process chart showing a flow of a cleaning process according to the first embodiment.

FIG. 3 is a process chart showing a flow of a cleaning process performed under control of the vehicle controller 35. The vehicle controller 35 performs this cleaning process at predetermined execution cycles when the vehicle 10 is started by the driver's ignition on operation and the detection sensors 11 are kept in the driving state.

At step S10, the vehicle controller 35 detects dirt of each of the detection sensors 11. The "dirt of the detection sensor 11" means adhesion of any foreign substance to the detection sensor 11, which may be a cause to reduce the detection accuracy of the detection sensor 11. The foreign substance includes, for example, liquid droplets, ice and snow, in addition to dust, grease and oil. Detection of dirt of the detection sensor 11 at step S10 accordingly means detection of adhesion of any foreign substance to the detection sensor 11. According to the first embodiment, the vehicle controller 35 detects dirt of every detection sensor 11.

The vehicle controller 35 uses a record of detection results of each of the detection sensors 11 during drive of the vehicle 10 to detect the dirt of the detection sensor 11. The vehicle controller 35 determines whether each of the detection sensors 11 is dirty or not, based on a change in characteristic obtained from an image generated by the signal processor 32 using the output signal of each of the detection sensors 11 during drive of the vehicle 10. For example, the vehicle controller 35 may divide the image into a plurality of blocks, periodically calculate an image frequency, an average luminance, a luminance gradient and the like with regard to each block and determine that the detection sensor 11 is dirty in the case where calculation results of any block do not satisfy predetermined reference values. In another example, when a millimeter wave radar is employed as the detection sensor 11, the vehicle controller 35 may record a time change in height of a spectral peak in the output signal of the detection sensor 11 and determine that the detection sensor 11 is dirty in the case where the degree in decrease of the peak height exceeds a reference value. In another example, the vehicle controller 35 may determine whether the detection sensor 11 is dirty or not, based on an optical flow extracted from a record of the generated image. For example, when any substance that does not move as expected for a certain time period irrespective of the move of the vehicle 10, the substance may be detected as the dirt of the detection sensor 11. Any of techniques disclosed in, for example, JP 2016-9099A, JP 2003-320866A and JP 2008-60874A may be employed as the technique of detecting the dirt of the detection sensor 11.

When no dirt is detected in any of the detection sensors 11, the vehicle controller 35 terminates the cleaning process without any further processing as shown by the arrow of NO at step S10. When dirt is detected in at least one of the detection sensors 11, on the other hand, the vehicle controller 35 performs a determination process of step S20 as shown by the arrow of YES at step S10.

At step S20, the vehicle controller 35 determines whether the fuel cell 20 is currently during power generation. When the fuel cell 20 is not during power generation, the vehicle controller 35 terminates the cleaning process without any further processing as shown by the arrow of NO at step S20. When the vehicle 10 is started but stops power generation of the fuel cell 20 due to some reason, discharge of water generated in the fuel cell 20 is interrupted. The generated water used for cleaning is thus likely to be insufficient. When the fuel cell 20 is during power generation, on the other hand, the vehicle controller 35 performs a determination process of step S30 as shown by the arrow of YES at step S20.

At step S30, the vehicle controller 35 determines whether the nozzle 101 for the detection sensor 11 that is specified as an object of cleaning in response to detection of dirt is normally driven or not. For example, the vehicle controller 35 may store a flag that indicates whether the driving state of each of the nozzles 101 is normal or not and may use this flag to perform the determination at step S30. The flag may be set, based on a driving result of the nozzle 101 in a past cleaning process or based on a result of a driving test of the nozzle 101 performed on a start of the vehicle 10 or periodically performed after a start of the vehicle 10.

When it is determined that the nozzle 101 as the object of determination is not in a normally drivable state, the vehicle controller 35 terminates the cleaning process without any further processing as shown by the arrow of NO at step S30. When it is determined that the nozzle 101 as the object of determination is in the normally drivable state, on the other hand, the vehicle controller 35 performs the processing of step S40 as shown by the arrow of YES at step S30.

At step S40, the vehicle controller 35 causes the generated liquid water to be ejected from the nozzle 101 and clean the detection sensor 11. According to the first embodiment, the vehicle controller 35 cleans only the detection sensor 11 that has dirt detected at step S10. According to another embodiment, the vehicle controller 35 may clean all the detection sensors 11.

At step S50, the vehicle controller 35 determines whether the dirt of the detection sensor 11 has been reduced or more specifically whether the foreign substance detected to adhere to the detection sensor 11 has been removed to at least an allowable level. The vehicle controller 35 uses an output signal of the detection sensor 11 that is obtained after the cleaning process of step S40 to make the determination. For example, when no element as a trigger to determine that the detection sensor 11 is dirty at step S10 is detected in an image generated from the output signal of the detection sensor 11, the vehicle controller 35 determines that the dirt of the detection sensor 11 has been reduced. When it is determined that the dirt has been reduced, the vehicle controller 35 terminates the cleaning process as shown by the arrow of YES at step S50.

When it is determined that the dirt has not been reduced, on the other hand, the vehicle controller 35 returns to step S20 as shown by the arrow of NO at step S50. The flow does not return to step S40 but returns to step S20, since a stop of power generation of the fuel cell 20 is likely to be detected by the determination process of step S20 or the non-drivable state of the nozzle 101 is likely to be detected by the determination process of step S30 in the course of the cleaning process.

When the dirt of the detection sensor 11 has not been reduced even after a predetermined number of times repetition of process of step S40 that ejects the generated water from the nozzle 101, an alarm process of step S60 may be performed as shown by a broken line arrow and a broken line box in FIG. 3. In the alarm process of step S60, the vehicle controller 35 may inform the driver of a failure in reducing the dirt, for example, by display on a display unit provided in an instrument panel of the vehicle 10 or by audio guidance using a speaker.

As described above, the vehicle 10 and the cleaning method of the detection sensors 11 according to the first embodiment use liquid water generated in the fuel cell 20 as the cleaning liquid to clean the detection sensors 11. This configuration suppresses the cleaning liquid from becoming insufficient and resulting in insufficient cleaning of the detection sensors 11, for example, during drive of the vehicle 10 and thereby reduces the possibility of misdetection due to the dirt of the detection sensor 11 in the drive control of the vehicle 10. This accordingly enhances the reliability of drive control of the vehicle 10. Even when the accumulating portion 93 is configured to have a small capacity, generated water is supplied from the fuel cell 20 to the accumulating portion 93 during power generation of the fuel cell 20. This configuration suppresses the insufficiency of the cleaning liquid for cleaning the detection sensors 11. This accordingly allows for downsizing of the accumulating portion 93 and saves the in-vehicle space for storing the cleaning liquid for cleaning the detection sensors 11. The water generated in the fuel cell 20 generally has a high temperature of approximately 60 to 80° C. immediately after being discharged. The generated water that has just been accumulated in the accumulating portion 93 and has a higher temperature than the ambient temperature may be used to clean the detection sensor 11. This enhances the removal efficiency of foreign substances, for example, oil and grease adhering to the detection sensor 11 or ice adhering to the detection sensor 11 in a sub-zero low temperature environment.

When the dirt of the detection sensor 11 is detected by using the output signal of the detection sensor 11, i.e., when adhesion of any foreign substance to the detection sensor 11 is detected, the vehicle 10 of the first embodiment automatically cleans the detection sensor 11. This configuration more appropriately reduces the possibility of misdetection due to the dirt of the detection sensor 11 and enhances the reliability of drive control of the vehicle 10.

Furthermore, the vehicle 10 of the first embodiment uses the generated water of the fuel cell 20 to clean the window glasses of the vehicle 10. This configuration efficiently saves a window washer liquid exclusively used for window glasses and saves the in-vehicle space for storing the window washer liquid. Additionally, the vehicle 10 and the cleaning method of the detection sensor 11 according to the first embodiment have various functions and advantageous effects described above with regard to the first embodiment.

2. Second Embodiment

Figure 4:
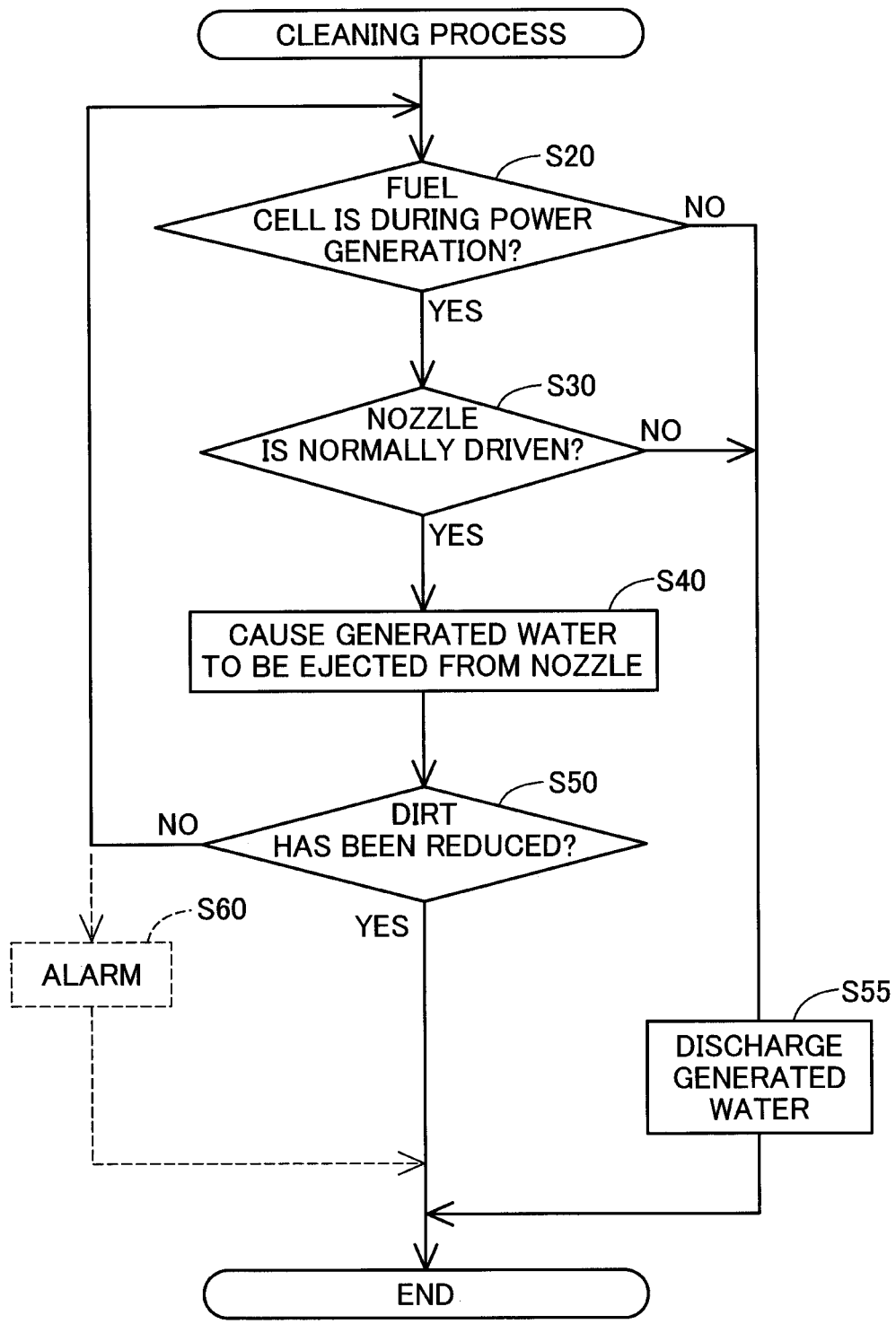
FIG. 4 is a process chart showing a flow of a cleaning process according to a second embodiment.

FIG. 4 is a process chart showing a flow of a cleaning process that performs a cleaning method according to a second embodiment. The flow of the cleaning process of the second embodiment is substantially similar to the flow of the cleaning process of the first embodiment shown in FIG. 3, except omission of the processing of step S10 and addition of the processing of step S55. The cleaning process of the second embodiment is performed in the vehicle 10 shown in FIGS. 1 and 2 as described in the first embodiment.

According to the second embodiment, the processing of step S10 described in the first embodiment is omitted. When the conditions are satisfied at the determination processes of steps S20 and S30, cleaning of the detection sensor 11 is performed at step S40, irrespective of no detection of the dirt of the detection sensor 11. In the cleaning process of the second embodiment, all the detection sensors 11 may be cleaned simultaneously in each execution cycle or part of the detection sensors 11 may be cleaned in a predetermined sequence in each execution cycle.

The execution cycle of the cleaning process of the second embodiment is a cycle experimentally or otherwise determined in advance such that the temperature of the generated water accumulated in the accumulating portion 93 is not decreased to be lower than the temperature of warm water. The temperature of warm water is a temperature higher than ordinary temperature and may be, for example, a temperature of not lower than 35° C. Performing the cleaning process at this execution cycle causes the generated water to be discharged from the accumulating portion 93 and ejected from the nozzle 101 at step S40 in the state of warm water having the temperature that is not decreased to the ordinary temperature. This configuration suppresses the generated water accumulated in the accumulating portion 93 from having a significant temperature decrease without being consumed for the cleaning process. Cleaning the detection sensor 11 by ejection of the generated water in the state of warm water enables the oil and grease adhering to the detection sensor 11 or part of the ice adhering to the detection sensor 11 in a sub-zero low temperature environment to be removed more efficiently. The vehicle controller 35 may determine the shorter execution cycle of the cleaning process at the lower ambient temperature, in order to shorten the consumption cycle of generated water accumulated in the accumulating portion 93 in the low temperature environment.

When the conditions are not satisfied at the determination processes of steps S20 and S30, on the other hand, cleaning of the detection sensor 11 is not performed at step S40. In this case, at step S55, the vehicle controller 35 opens the on-off valve 95v to discharge the generated water accumulated in the accumulating portion 93 through the discharge piping 95 to the cathode off-gas piping 56. This configuration suppresses the generated water of the decreased temperature from being kept in the accumulating portion 93 without consumption, because of no execution of the processing of step S40.

In order to avoid the state of insufficiency of the generated water accumulated in the accumulating portion 93, the execution cycle of the cleaning process is desirably set to start a next cleaning process after elapse of a time period required for accumulation of a sufficient amount of generated water in the accumulating portion 93. In another example, a standby time may be provided to accumulate a sufficient amount of generated water in the accumulating portion 93 after the processing of step S40 or step S55 in the cleaning process.

As described above, in the cleaning process of the second embodiment, the vehicle controller 35 repeatedly performs cleaning of the detection sensor 11 at predetermined cycles by using water generated in the fuel cell 20 during power generation of the fuel cell 20 and causes the liquid water in the state of warm water having the temperature that is not yet decreased to the ordinary temperature, to be discharged from the accumulating portion 93. The cleaning process of the second embodiment accordingly enables the detection sensor 11 to be cleaned at regular intervals by using the generated water in the state of warm water. This configuration thus more efficiently removes foreign substances, for example, oil and grease adhering to the detection sensor 11 or ice adhering to the detection sensor 11 in the sub-zero low temperature environment. Additionally, the vehicle 10 and the cleaning method of the detection sensor 11 according to the second embodiment have various functions and advantageous effects described above with regard to the first embodiment and the second embodiment.

3. Third Embodiment

Figure 5:
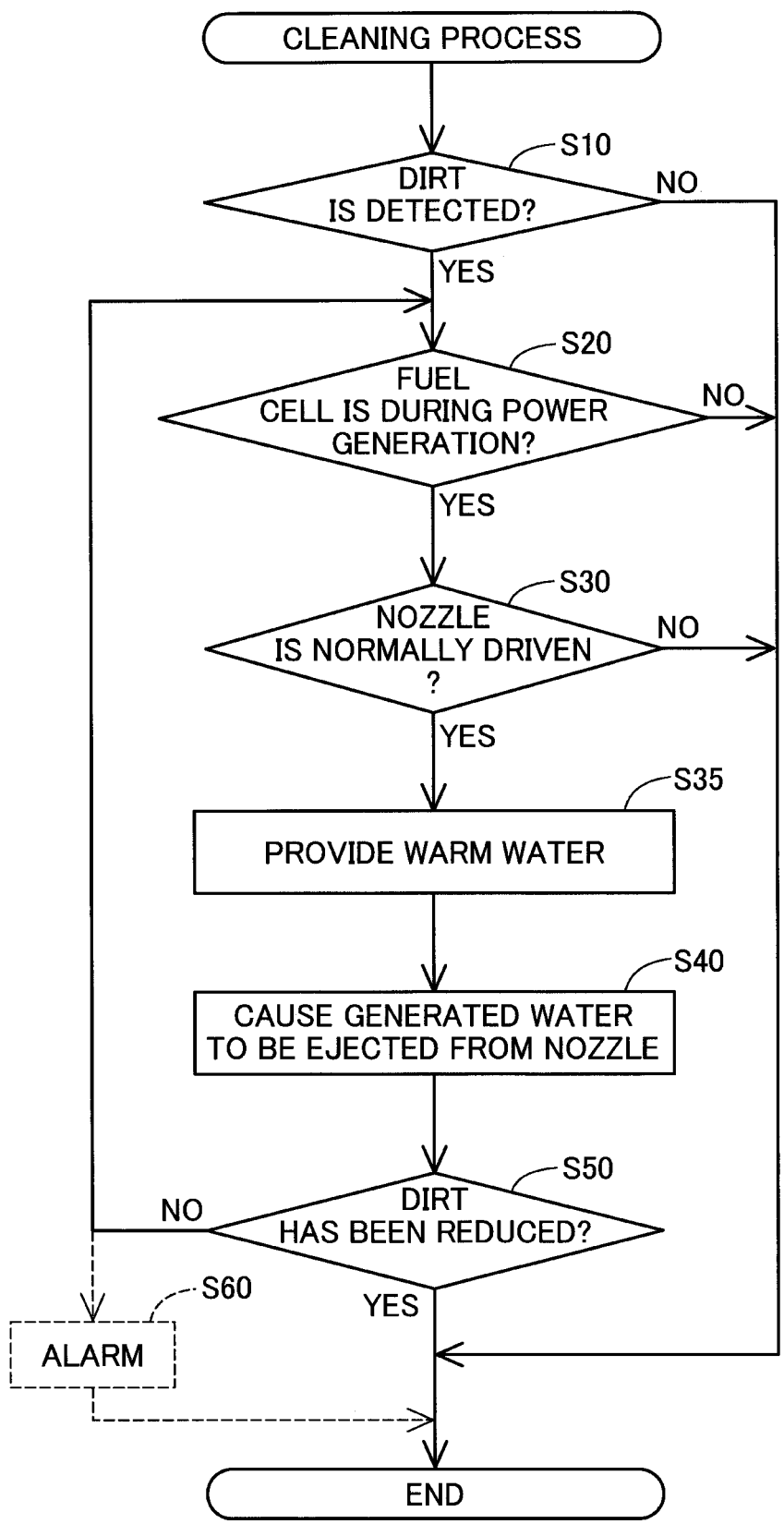
FIG. 5 is a process chart showing a flow of a cleaning process according to a third embodiment.

FIG. 5 is a process chart showing a flow of a cleaning process that performs a cleaning method according to a third embodiment. The flow of the cleaning process of the third embodiment is substantially similar to the flow of the cleaning process of the first embodiment shown in FIG. 3, except addition of the processing of step S35. The cleaning process of the third embodiment is performed in the vehicle 10 shown in FIGS. 1 and 2 as described in the first embodiment.

At step S35, the vehicle controller 35 provides warm water that is to be used to clean the detection sensor 11 at step S40. More specifically, the vehicle controller 35 opens the on-off valve 94v provided in the collecting piping 94 of the collecting portion 91 to lead the generated high-temperature water just discharged from the fuel cell 20 to the accumulating portion 93 via the gas liquid separator 92 and the collecting piping 94 and waits until a required amount of warm water is accumulated in the accumulating portion 93. After providing the required amount of warm water, the vehicle controller 35 uses the warm water to clean the detection sensor 11 at step S40.

According to a modification, the vehicle controller 35 may temporarily open the on-off valve 95v of the discharge piping 95 to discharge the liquid water that is left in the accumulating portion 93 and that has the decreased temperature, before opening the on-off valve 94v of the collecting piping 94 at step S35. This modified configuration suppresses the generated water that has the decreased temperature during accumulation in the accumulating portion 93 to be mixed with warm water newly accumulated in the accumulating portion 93 at step S35 and thereby suppresses reduction in temperature of the warm water that is to be ejected from the nozzle 101.

As described above, when the dirt of the detection sensor 11 is detected, the cleaning process of the third embodiment provides the generated water in the state of warm water to clean the detection sensor 11. This configuration more efficiently removes foreign substances adhering to the detection sensor 11, such as oil and grease or ice. Additionally, the vehicle 10 and the cleaning method of the detection sensor 11 according to the third embodiment have various functions and advantageous effects described above with regard to the first embodiment and the third embodiment.

4. Fourth Embodiment

Figure 6A:
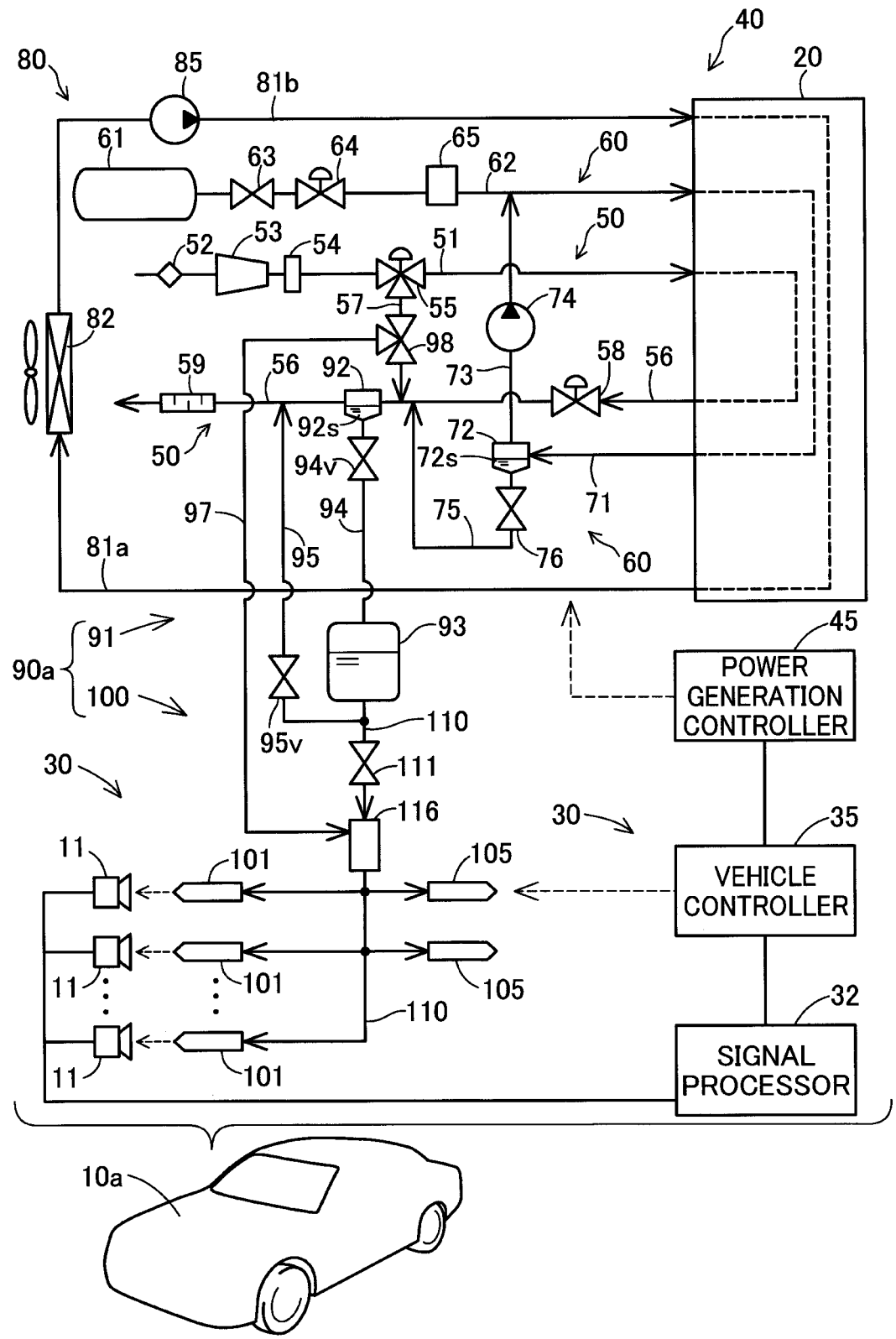
FIG. 6A is a schematic diagram illustrating the system configuration of a vehicle according to a fourth embodiment.

FIG. 6A is a schematic diagram illustrating the system configuration of a vehicle 10a according to a fourth embodiment. The configuration of the vehicle 10a of the fourth embodiment is substantially similar to the configuration of the vehicle 10 of the first embodiment shown in FIG. 1, except that the vehicle 10a is provided with a cleaning system 90a that uses a pressure generated by the compressor 53 of the oxidizing gas supply discharge system 50 to eject generated water from the nozzle 101. The cleaning system 90a of the fourth embodiment has a configuration substantially similar to the configuration of the cleaning system 90 of the first embodiment shown in FIG. 1, except some differences described below. The vehicle controller 35 performs a cleaning process according to the flow of FIG. 3 described in the first embodiment.

In the cleaning system 90a of the fourth embodiment, an on-off valve 111 is provided in the supply piping 110. A pressure applying portion 116 is also provided in the supply piping 110, in place of the pressure pump 115. The discharge piping 95 described in the first embodiment is connected with the supply piping 110 on an upstream side of the on-off valve 111. The pressure applying portion 116 is provided on a downstream side of the on-off valve 111. As described below, the pressure applying portion 116 is configured to cause the pressure generated by the compressor 53 of the oxidizing gas supply discharge system 50 to be applied to the generated water flowing from the accumulating portion 93 into the supply piping 110.

The cleaning system 90a of the fourth embodiment additionally includes a pressure piping 97 and a branch valve 98 configured to transmit the pressure generated by the compressor 53 to the pressure applying portion 116. The pressure piping 97 is connected with the bypass piping 57 via the branch valve 98. The vehicle controller 35 controls the branch valve 98 to connect the bypass piping 57 with the pressure applying portion 116 and thereby leads part of the compressed gas fed from the compressor 53 into the pressure applying portion 116.

Figure 6B:
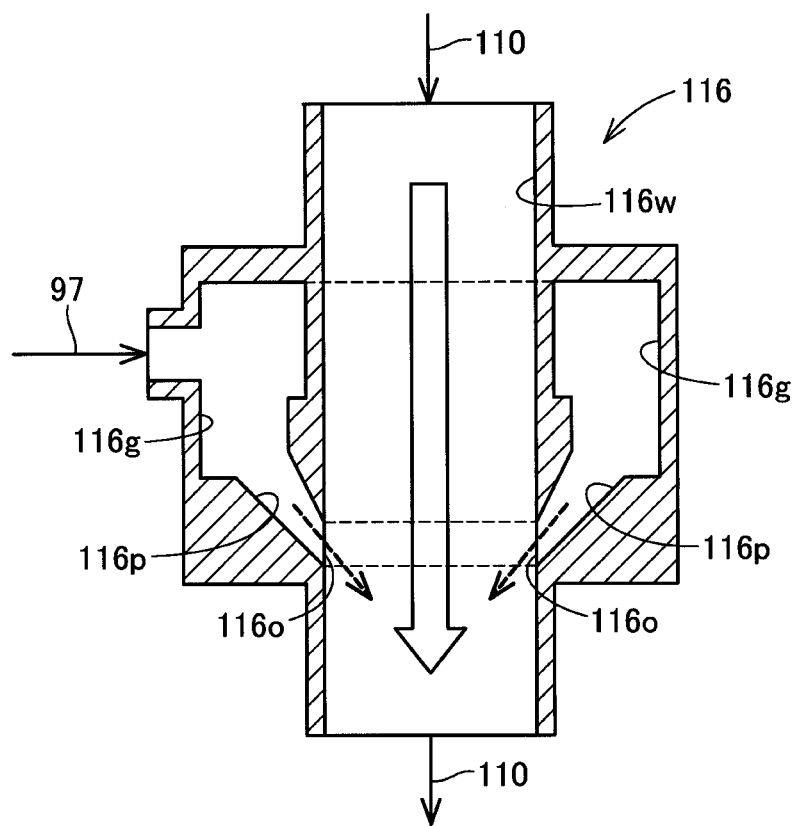
FIG. 6B is a schematic sectional view illustrating the configuration of a pressure applying portion according to the fourth embodiment.

FIG. 6B is a schematic sectional view illustrating the configuration of the pressure applying portion 116. The pressure applying portion 116 includes a liquid water passage portion 116w which the generated water flows in from the supply piping 110, and a gas passage portion 116g which is connected with the pressure piping 97 and which the compressed gas flows in from the pressure piping 97. The liquid water passage portion 116w is configured by a piping member and is mounted in the middle of the supply piping 110. The liquid water passage portion 116w has respective ends connected with the supply piping 110. The gas passage portion 116g is provided as a ring-shaped flow path that surrounds the outer circumference of the liquid water passage portion 116w and is connected with the liquid water passage portion 116w through an injection opening 116o provided at an end thereof. The gas passage portion 116g has a connection path 116p that is connected with the ejection opening 116o. The connection path 116p is obliquely connected with the liquid water passage portion 116w such as to cause the compressed gas to be flowed out to the liquid water passage portion 116w at an acute angle relative to the flow direction of the generated water. The connection path 116p is formed to gradually reduce the opening area toward the ejection opening 116o.

Referring to FIG. 6A, when the generated water is not ejected from the nozzle 101, the vehicle controller 35 controls the branch valve 98 to disconnect the bypass piping 57 from the pressure piping 97 and closes the on-off valve 111 to block the inflow of the generated water into the pressure applying portion 116. When the generated water is ejected from the nozzles 101 and 105 at step S40 in the cleaning process, the vehicle controller 35 first opens on-off valves, which is not shown in the figures, built in the respective nozzles 101. The vehicle controller 35 subsequently controls the flow dividing valve 55 and the branch valve 98 to lead part of the compressed gas supplied to the fuel cell 20, into the pressure piping 97. The compressed gas in the pressure piping 97 is accordingly ejected through the gas passage portion 116g shown in FIG. 6B to the liquid water passage portion 116w. At this time, the vehicle controller 35 desirably increases the pressure generated by the compressor 53 by an amount of pressure branched to the pressure piping 97, in order to suppress a pressure drop on the cathode side of the fuel cell 20.

The vehicle controller 35 subsequently opens the on-off valve 111 shown in FIG. 6A to start the inflow of the generated water from the supply piping 110 into the liquid water passage portion 116w shown in FIG. 6B. Before the on-off valve 111 is opened, a negative pressure is generated on an upstream side of the ejection opening 116o in the liquid water passage portion 116w by ejection of the compressed gas from the ejection opening 116o. Accordingly, when the on-off valve 111 is opened, the generated water in the supply piping 110 is sucked into the liquid water passage portion 116w by the negative pressure. The generated water flowing to the downstream side of the ejection opening 116o in the liquid water passage portion 116w then receives the pressure from the compressed gas through the ejection opening 116o to be ejected from the nozzle 101 toward the detection sensor 11. In the vehicle 10a, the vehicle controller 35 also uses the pressure of the compressor 53 to eject the generated water from the window nozzle 105 by a similar method.

According to a modification, the vehicle controller 35 may keep the connection of the bypass piping 57 with the pressure piping 97 for a predetermined time period after closing the on-off valve 111 to complete ejection of the generated water from the nozzle 101 at step S40. This modified configuration enables the compressed gas supplied through the pressure piping 97 to be ejected from the nozzle 101 toward the detection sensor 11 after a stop of ejection of the generated water. This enables droplets of the generated water and other foreign substances adhering to the detection sensor 11 to be removed promptly by the pressure of the compressed gas.

As described above, in the vehicle 10a of the fourth embodiment, the cleaning portion 100 of the cleaning system 90a applies the pressure generated by the compressor 53 to the generated water via the pressure piping 97 and the pressure applying portion 116 and thereby causes the generated water to be ejected from the nozzle 101. This vehicle 10a efficiently uses the driving force of the compressor 53 that is used for control of power generation of the fuel cell 20, to eject the generated water from the nozzle 101. Additionally, the vehicle 10a and the cleaning method of the detection sensor 11 according to the fourth embodiment have various functions and advantageous effects described above with regard to the first embodiment and the fourth embodiment.

5. Fifth Embodiment

Figure 7A:
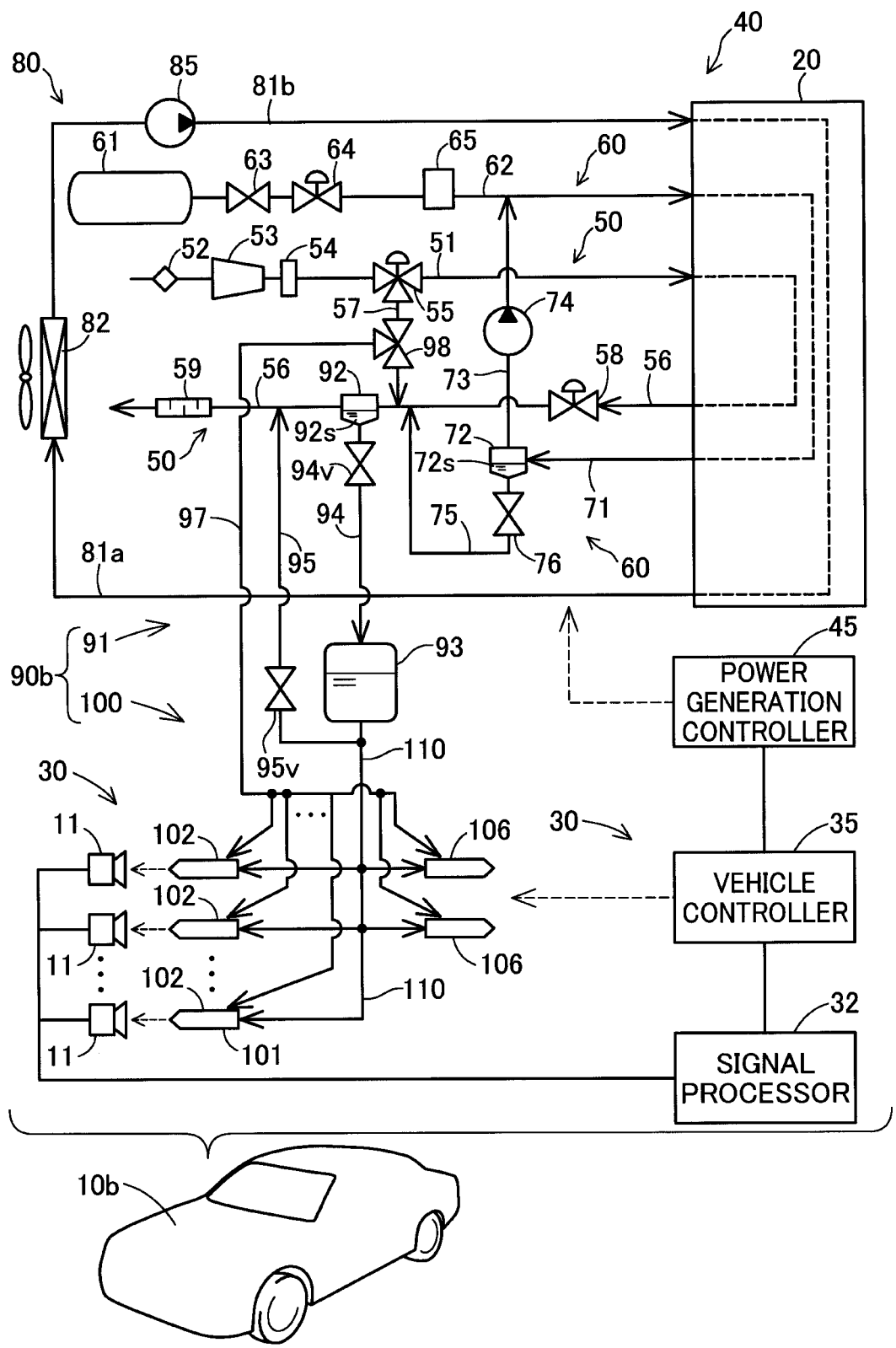
FIG. 7A is a schematic diagram illustrating the system configuration of a vehicle according to a fifth embodiment.

FIG. 7A is a schematic diagram illustrating the system configuration of a vehicle 10b according to a fifth embodiment. The configuration of the vehicle 10b of the fifth embodiment is substantially similar to the configuration of the vehicle 10a of the fourth embodiment shown in FIG. 6A, except that the vehicle 10b is provided with a cleaning system 90b of the fifth embodiment, in place of the cleaning system 90a of the fourth embodiment. The cleaning system 90b of the fifth embodiment has a configuration substantially similar to the configuration of the cleaning system 90a of the fourth embodiment, except some differences described below. The configuration of using the pressure generated by the compressor 53 to eject the generated water is common to both the cleaning system 90a of the fourth embodiment and the cleaning system 90b of the fifth embodiment. As in the vehicle 10a of the fourth embodiment, in the vehicle 10b of the fifth embodiment, the vehicle controller 35 performs a cleaning process according to the flow of FIG. 3 described in the first embodiment.

The cleaning system 90b of the fifth embodiment is configured with omission of the pressure applying portion 116 in the supply piping 110. The cleaning portion 100 includes gas pressure ejection nozzles 102 configured to eject the generated water toward the detection sensors 11 and gas pressure ejection nozzles 106 configured to eject the generated water toward the windows, in place of the nozzles 101 and 105. A pressure piping 97 is branched to be connected with the respective gas pressure ejection nozzles 102 and 106.

Figure 7B:
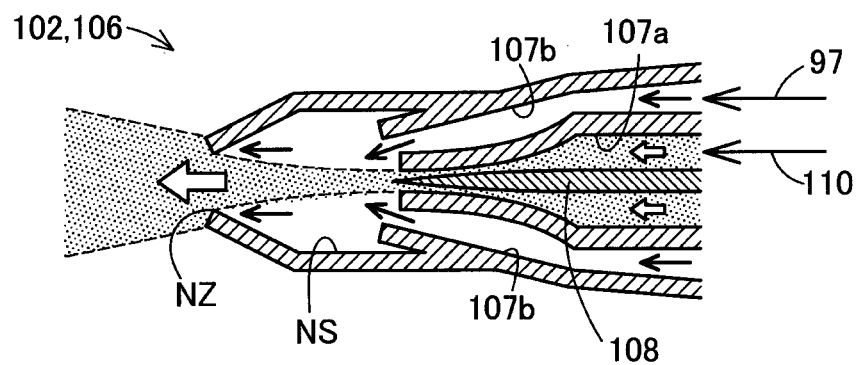
FIG. 7B is a schematic sectional view illustrating the configuration of a gas pressure ejection nozzle according to the fifth embodiment.

FIG. 7B is a schematic diagram illustrating an ejection mechanism of the gas pressure ejection nozzles 102 and 106. FIG. 7B schematically illustrates a section of the gas pressure ejection nozzle 102 or 106 at any cutting plane passing through a center axis in a leading end portion of the gas pressure ejection nozzle 102 or 106. According to the fifth embodiment, the gas pressure ejection nozzles 102 for the detection sensors 11 and the gas pressure ejection nozzles 106 for the windows have a common configuration to eject the generated water.

The gas pressure ejection nozzle 102 includes an internal space NS on a leading end portion thereof to communicate with a nozzle hole NZ which the generated water is ejected from. The gas pressure ejection nozzle 102 also includes a first inner nozzle 107a and a second inner nozzle 107b that are open to the internal space NS.

The first inner nozzle 107a has an upstream end that is connected with the supply piping 110 and causes the generated water to be ejected from a leading end portion thereof placed in the internal space NS toward the internal space NS. A needle valve 108 is provided inside of the first inner nozzle 107a to open and close a discharge outlet at a leading end of the first inner nozzle 107a. The needle valve 108 is driven under control of the vehicle controller 35.

The second inner nozzle 107b has a leading end portion that is open in the surrounding of the first inner nozzle 107a. The second inner nozzle 107b has an upstream end that is connected with the pressure piping 97 and is configured to eject the compressed air toward a region closer to the nozzle hole NZ than the first inner nozzle 107a.

When the generated water is not ejected from the gas pressure ejection nozzle 102, the vehicle controller 35 controls the needle valve 108 shown in FIG. 7B to close the first inner nozzle 107a. The vehicle controller 35 also controls the branch valve 98 shown in FIG. 7A to disconnect the bypass piping 57 from the pressure piping 97 and stop the supply of the compressed gas to the second inner nozzle 107b. When the generated water is ejected from the gas pressure ejection nozzle 102 at step S40 in the cleaning process, the vehicle controller 35 first controls the flow dividing valve 55 and the branch valve 98 shown in FIG. 7A to lead part of the compressed gas supplied to the fuel cell 20, into the pressure piping. The compressed gas in the pressure piping 97 is accordingly ejected from a leading end of the second inner nozzle 107*b* shown in FIG. 7B into the internal space NS. At this time, the vehicle controller 35 desirably increases the pressure generated by the compressor 53 shown in FIG. 7A by an amount of pressure branched to the pressure piping 97, in order to suppress a pressure drop on the cathode side of the fuel cell 20.

Referring to FIG. 7B, when the compressed gas is ejected from the leading end of the second inner nozzle 107*b*, a negative pressure is generated in the vicinity of the discharge outlet of the first inner nozzle 107*a*. After generation of this negative pressure, the vehicle controller 35 drives the needle valve 108 to open the discharge outlet of the first inner nozzle 107*a*. The generated water is then sucked from the discharge outlet of the first inner nozzle 107*a* into the internal space NS by the negative pressure generated in the internal space NS. The generated water discharged from the discharge outlet of the first inner nozzle 107*a* into the internal space NS is ejected from the nozzle hole NZ to the outside by the ejection pressure of the compressed gas. In the vehicle 10*b*, the vehicle controller 35 also uses the pressure of the compressor 53 to eject the generated water from the gas pressure ejection nozzle 106 for the window by a similar method.

According to a modification, the vehicle controller 35 may keep the connection of the bypass piping 57 with the pressure piping 97 for a predetermined time period after controlling the needle valve 108 to close the first inner nozzle 107*a* in order to complete ejection of the generated water from the gas pressure ejection nozzle 102 at step S40. This modified configuration enables the compressed gas supplied through the pressure piping 97 to be ejected from the gas pressure ejection nozzle 102 toward the detection sensor 11 after a stop of ejection of the generated water from the gas pressure ejection nozzle 102. This enables droplets of the generated water and other foreign substances adhering to the detection sensor 11 to be removed promptly by the pressure of the compressed gas.

As described above, in the vehicle 10*b* of the fifth embodiment, the cleaning portion 100 of the cleaning system 90*b* transmits the pressure generated by the compressor 53 to the gas pressure ejection nozzles 102 and 106 via the pressure piping 97 to eject the generated water. This vehicle 10*b* efficiently uses the driving force of the compressor 53 that is used for control of power generation of the fuel cell 20, to eject the generated water from the gas pressure ejection nozzles 102 and 106. Additionally, the vehicle 10*b* and the cleaning method of the detection sensor 11 according to the fifth embodiment have various functions and advantageous effects described above with regard to the first embodiment, the fourth embodiment and the fifth embodiment.

6. Sixth Embodiment

Figure 8:
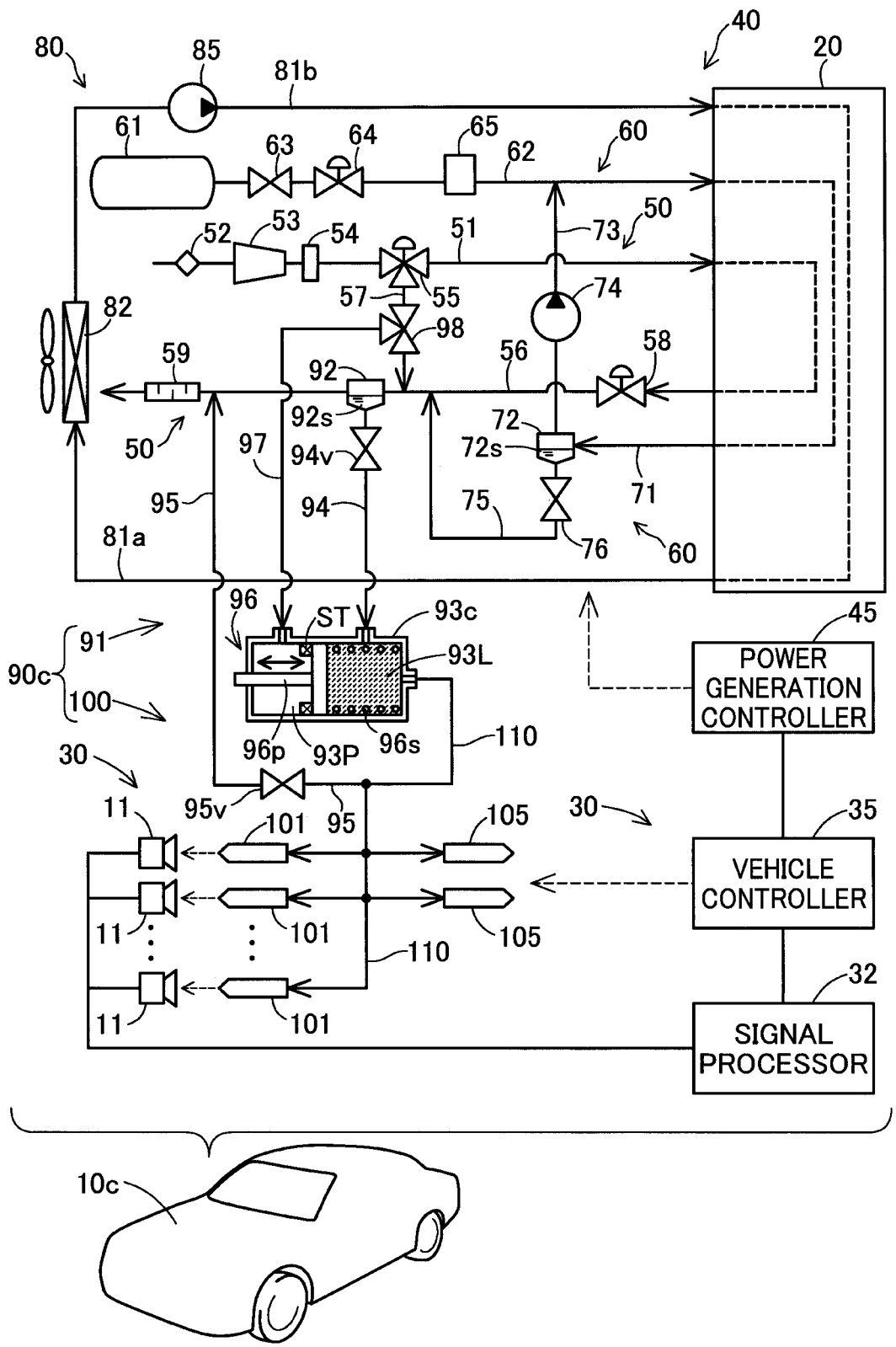
FIG. 8 is a schematic diagram illustrating the system configuration of a vehicle according to a sixth embodiment.

FIG. 8 is a schematic diagram illustrating the system configuration of a vehicle 10*c* according to a sixth embodiment. The configuration of the vehicle 10*c* of the sixth embodiment is substantially similar to the configuration of the vehicle 10*a* of the fourth embodiment shown in FIG. 6A, except that the vehicle 10*c* is provided with a cleaning system 90*c* of the sixth embodiment, in place of the cleaning system 90*a* of the fourth embodiment. The cleaning system 90*c* of the sixth embodiment has a configuration substantially similar to the configuration of the cleaning system 90*a* of the fourth embodiment, except some differences described below. The configuration of using the pressure generated by the compressor 53 to eject the generated water is common to both the cleaning system 90*a* of the fourth embodiment and the cleaning system 90*c* of the sixth embodiment. As in the vehicle 10*a* of the fourth embodiment, in the vehicle 10*c* of the sixth embodiment, the vehicle controller 35 performs a cleaning process according to the flow of FIG. 3 described in the first embodiment.

In the cleaning system 90*c* of the sixth embodiment, a collecting portion 91 includes an accumulating portion 93*c* provided with a pressure applying mechanism 96 configured to apply a pressure to the generated water, in place of the accumulating portion 93. In the cleaning system 90*c* of the sixth embodiment, a pressure piping 97 is connected with the pressure applying mechanism 96.

The pressure applying mechanism 96 includes a piston 96*p*. Inside of the accumulating portion 93*c* is parted into a liquid chamber 93L which stores the generated water therein and a pressure chamber 93P which the compressed gas is led into, by a wall portion provided at a leading end of the piston 96*p*. A collecting piping 94 arranged to lead the generated water into the accumulating portion 93*c* and a supply piping 110 arranged to connect the accumulating portion 93*c* with nozzles 101 and 105 are connected with the liquid chamber 93L. A biasing member 96*s* is placed in the liquid chamber 93L to press the piston 96*p* toward the pressure chamber 93P-side. A stopper ST is provided in the pressure chamber 93P to restrict an excessive move of the piston 96*p* toward the pressure chamber 93P-side. The piston 96*p* is displaced according to the pressure in the pressure chamber 93P to change the volume of the liquid chamber 93L. This configuration causes the pressure in the pressure chamber 93P to be applied to the generated water accumulated in the liquid chamber 93L.

The pressure piping 97 is connected with the pressure chamber 93P. The pressure piping 97 is also connected with the bypass piping 57 via the branch valve 98. The vehicle controller 35 controls the branch valve 98 to connect the bypass piping 57 with the pressure piping 97 and thereby leads part of the compressed gas fed from the compressor 53 into the pressure chamber 93P. This configuration increases the pressure in the pressure chamber 93P and applies the pressure to the generated water accumulated in the liquid chamber 93L.

At step S40 in the cleaning process, the vehicle controller 35 first controls the flow dividing valve 55 and the branch valve 98 to lead part of the compressed gas supplied to the fuel cell 20, into the pressure piping 97 and thereby apply the pressure to the generated water accumulated in the liquid chamber 93L. At this time, the vehicle controller 35 desirably increases the pressure generated by the compressor 53 by an amount of pressure branched to the pressure chamber 93P, in order to suppress a pressure drop on the cathode side of the fuel cell 20. After the pressure of the generated water accumulated in the liquid chamber 93L is increased, the vehicle controller 35 opens an on-off valve built in the nozzle 101 to eject the generated water from the nozzle 101 toward the detection sensor 11. In the vehicle 10*c*, the vehicle controller 35 also uses the pressure of the compressor 53 to eject the generated water from the window nozzle 105 by a similar method.

As described above, in the vehicle 10*c* of the sixth embodiment, the cleaning portion 100 of the cleaning system 90*c* transmits the pressure generated by the compressor 53 to the pressure chamber 93P via the pressure piping 97, so as to apply the pressure to the generated water accumulated in the accumulating portion 93*c* and thereby cause the generated water to be ejected from the nozzle 101. This vehicle 10*c* efficiently uses the driving force of the compressor 53 that is used for control of power generation of the fuel cell 20, to eject the generated water from the nozzle 101. Additionally, the vehicle 10*c* and the cleaning method of the detection sensor 11 according to the sixth embodiment have various functions and advantageous effects described above with regard to the first embodiment and the sixth embodiment.

7. Seventh Embodiment

Figure 9:
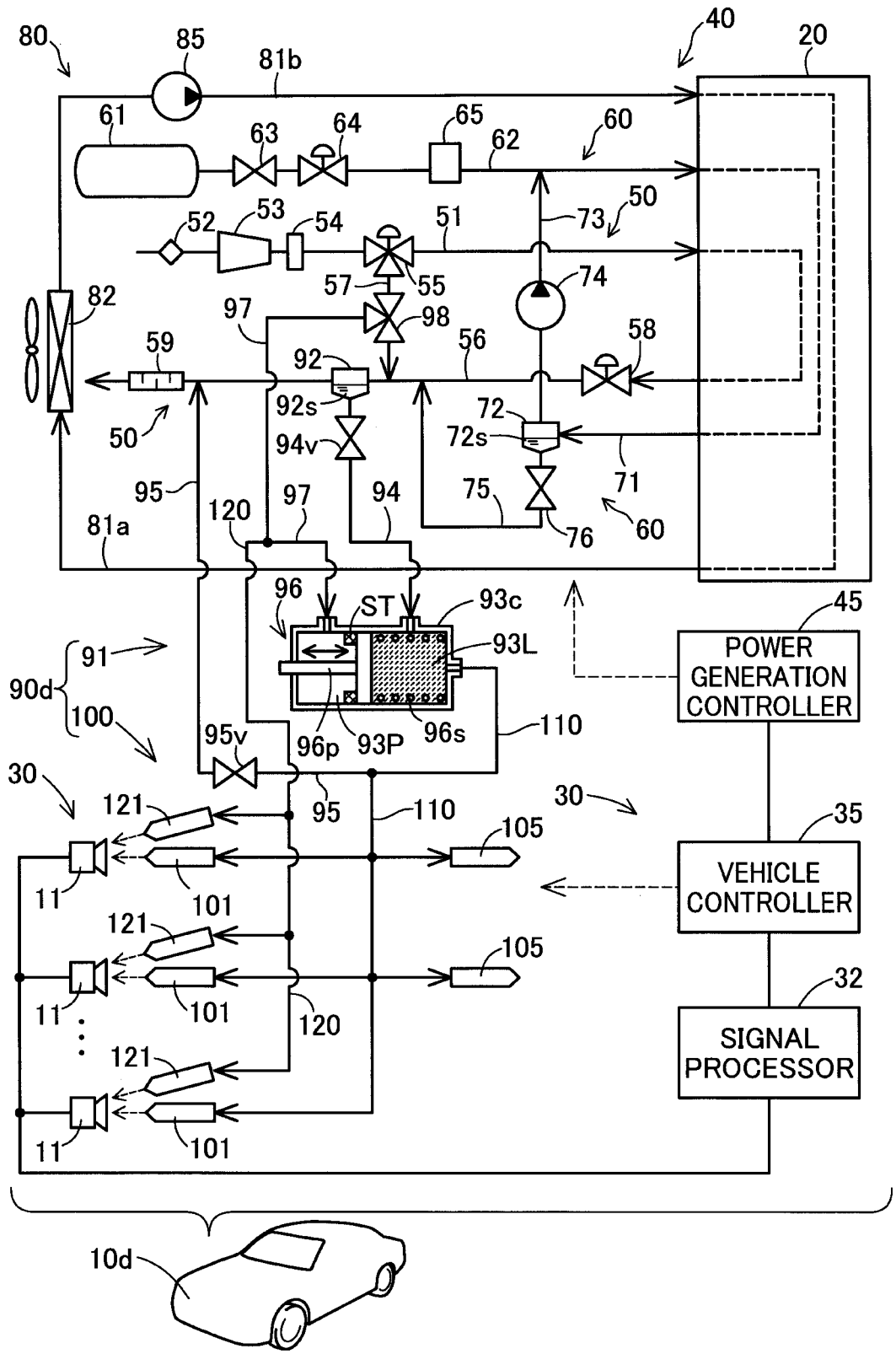
FIG. 9 is a schematic diagram illustrating the system configuration of a vehicle according to a seventh embodiment.

FIG. 9 is a schematic diagram illustrating the system configuration of a vehicle 10*d* according to a seventh embodiment. The vehicle 10*d* of the seventh embodiment has a substantially similar configuration to the configuration of the vehicle 10*c* of the sixth embodiment shown in FIG. 8, except that the cleaning portion 100 is additionally provided with a branch piping 120 connected in the middle of the pressure piping 97 and a plurality of gas nozzles 121 connected with the branch piping 120. As in the vehicle 10*c* of the sixth embodiment, in the vehicle 10*d* of the seventh embodiment, the vehicle controller 35 performs a cleaning process according to the flow of FIG. 3 described in the first embodiment.

A cleaning system 90*d* of the seventh embodiment performs cleaning of the detection sensors 11 by the gas nozzles 121 configured to eject the compressed gas that is supplied to the fuel cell 20, in addition to cleaning of the detection sensors 11 by the nozzles 101 configured to eject the generated water. An on-off valve is built in each of the gas nozzles 121. The on-off valve of the gas nozzle 121 is normally closed and is opened under control of the vehicle controller 35. When the on-off valve of the gas nozzle 121 is opened, the compressed gas flowing from the pressure piping 97 into the branch piping 120 is ejected from the gas nozzle 121.

According to the seventh embodiment, the gas nozzles 121 are provided in one-to-one correspondence to the respective detection sensors 11. Like the nozzles 101 configured to eject the generated water, each of the gas nozzles 121 is placed such that a nozzle hole thereof is open to the corresponding detection sensor 11. According to another embodiment, the gas nozzle 121 may be provided for only part of the detection sensors 11. The cleaning portion 100 may have only one gas nozzle 121. According to another embodiment, a plurality of gas nozzles 121 may be provided for one detection sensor 11. The nozzle 101 and the gas nozzle 121 may be integrated with each other.

In the vehicle 10*d* of the seventh embodiment, the vehicle controller 35 causes the compressed gas to be ejected from the gas nozzle 121 toward the detection sensor 11 after ejection of the generated water from the nozzle 101 toward the detection sensor 11 in the cleaning process. This configuration enables droplets of the generated water adhering to the detection sensor 11 during cleaning and other foreign substances to be removed promptly by the pressure of the compressed gas. This configuration further reduces the possibility of misdetection due to the dirt of the detection sensor 11 and enhances the reliability of drive control of the vehicle 10*d*. Additionally, the vehicle 10*d* and the cleaning method of the detection sensor 11 according to the seventh embodiment have various functions and advantageous effects described above with regard to the first embodiment, the sixth embodiment and the seventh embodiment.

8. Eighth Embodiment

Figure 10:
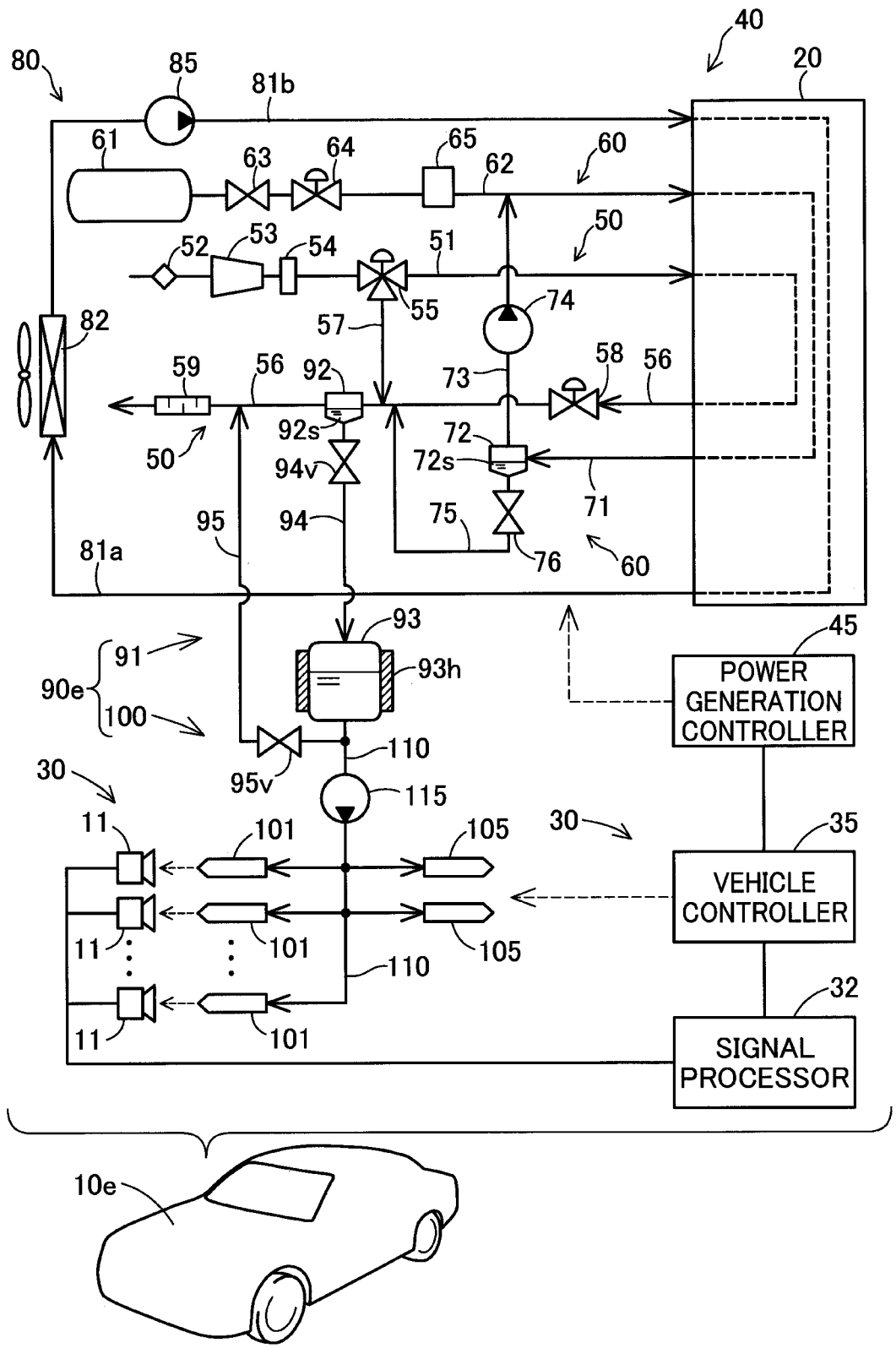
FIG. 10 is a schematic diagram illustrating the system configuration of a vehicle according to an eighth embodiment.

FIG. 10 is a schematic diagram illustrating the system configuration of a vehicle 10*e* according to an eighth embodiment. A cleaning system 90*e* provided in the vehicle 10*e* of the eighth embodiment has a substantially similar configuration to the configuration of the cleaning system 90 provided in the vehicle 10 of the first embodiment shown in FIG. 1, except that the cleaning system 90*e* includes a heat retaining portion 93*h* to keep the generated water accumulated in the accumulating portion 93 warm. The heat retaining portion 93*h* may be configured by, for example, a heat insulating member provided to cover the accumulating portion 93. The vehicle 10*e* of the eighth embodiment suppresses a temperature drop of the generated water accumulated in the accumulating portion 93 and thereby enables the detection sensor 11 to be efficiently cleaned with the generated water of the higher temperature. This configuration also suppresses the generated water accumulated in the accumulating portion 93 from being frozen in a low temperature environment to fail in cleaning the detection sensor 11. Additionally, the vehicle 10*e* and the cleaning method of the detection sensor 11 according to the eighth embodiment have various functions and advantageous effects described above with regard to the above respective embodiments.

9. Other Embodiments

Various configurations described in the above respective embodiments may be modified, for example, as described below. Other embodiments described below should also be regarded as some examples of the aspects of the present disclosure like the above respective embodiments.

9-1. Another Embodiment 1

In the above respective embodiments, the cleaning system 90, 90*a*, 90*b*, 90*c*, 90*d* or 90*e* may be configured to cause a cleaning solution produced by adding a detergent to the generated water to be ejected from the nozzle 101 or 102 toward the detection sensor 11. In the above respective embodiments, the cleaning system 90, 90*a*, 90*b*, 90*c*, 90*d* or 90*e* may be configured to cause the generated water to be ejected from the nozzle 101 or 102 toward the detection sensor 11 when receiving the driver's operation. In the above respective embodiments, the cleaning system 90, 90*a*, 90*b*, 90*c*, 90*d* or 90*e* may be configured to use the generated water in the state of warm water just discharged from the fuel cell 20 to clean the detection sensor 11 again after consumption of the generated water having the temperature decreased to ordinary temperature for cleaning of the detection sensor 11.

9-2. Another Embodiment 2

In the above respective embodiments, the water accumulating portion 92*s* of the gas liquid separator 92 may also serve as an accumulating portion configured to accumulate the liquid water ejected from the nozzles 101 or 102 in the cleaning portion 100. In the fourth embodiment, the fifth embodiment, the sixth embodiment and the seventh embodiment described above, the pressure piping 97 may be connected not with the bypass piping 57 but with the cathode gas piping 51.

9-3. Another Embodiment 3

The flow of the cleaning process of the first embodiment and the flow of the cleaning process of the second embodiment described above may be combined with each other. More specifically, a modified flow of the cleaning process may periodically perform cleaning of the detection sensors 11 at predetermined execution cycles and may perform cleaning of the detection sensor 11 in response to detection of the dirt of the detection sensor 11 irrespective of the execution cycle. In the vehicles 10a, 10b, 10c, 10d and 10e of the fourth embodiment, the fifth embodiment, the sixth embodiment, the seventh embodiment and the eighth embodiment, the vehicle controller 35 may perform the cleaning process according to the flow described in the second embodiment or according to the flow described in the third embodiment. According to another modification, the vehicle controller 35 may perform the cleaning process according to the combined flow of the first embodiment and the second embodiment.

9-4. Another Embodiment 4

In the cleaning process of the vehicle 10d according to the above seventh embodiment, the vehicle controller 35 may cause the compressed gas to be ejected from the gas nozzle 121 toward the detection sensor 11 simultaneously with causing the generated water to be ejected from the nozzle 101 toward the detection sensor 11. This modified configuration also enhances the effect of removing foreign substances adhering to the detection sensor 11. In the cleaning process of the vehicle 10d according to the above seventh embodiment, the vehicle controller 35 may cause the generated water to be ejected from the nozzle 101 toward the detection sensor 11 after ejection of the compressed gas from the gas nozzle 121 toward the detection sensor 11. The branch piping 120 and the gas nozzles 121 described in the above seventh embodiment may be applied to the cleaning portion 100 provided in the cleaning systems 90, 90a, 90b and 90e of the first embodiment the fourth embodiment, the fifth embodiment and the eighth embodiment. In each of the above embodiments, the cleaning process described in the seventh embodiment or described in another embodiment 4 may be performed.

9-5. Another Embodiment 5

The heat retaining portion 93h described in the above eighth embodiment may be configured by, for example, a heating mechanism such as an electric heater provided to heat an internal space of the accumulating portion 93 or 93c. The heat retaining portion 93h described in the above eighth embodiment or the heating mechanism described above may be applied to the accumulating portion 93 or 93c in any of the other embodiments. The gas liquid separator 92 or the gas liquid separator 72 may also be provided with a heat retaining structure or a heat retaining mechanism to provide the heat retaining function like the heat retaining portion 93h. The accumulating portion 93 or 93c may be placed near to the fuel cell 20, in order to receive the heat from the fuel cell 20.

9-6. Another Embodiment 6

In the embodiments described above, part or all of the functions and the processing implemented by the software configuration may be implemented by hardware configuration. Part or all of the functions and the processing implemented by the hardware configuration may be implemented by software configuration. Various circuits, for example, integrated circuits, discrete circuits or circuit modules by combining these circuits may be used as the hardware configuration.

The present disclosure is not limited to any of the embodiments, the examples and the modifications described above but may be implemented by various other configurations without departing from the scope of the present disclosure. For example, the technical features of any of the above embodiments and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein, whether or not the technical feature is explicitly mentioned as not essential in the description hereof. The present disclosure may be implemented by aspects described below.

According to a first aspect, there is provided a vehicle. The vehicle of this aspect comprises a detection sensor used to detect a surrounding condition of the vehicle; a vehicle controller configured to perform drive control of the vehicle by using a signal output from the detection sensor; a fuel cell configured to generate electric power while generating water; an accumulating portion configured to accumulate the generated water discharged from the fuel cell therein as liquid water; and a cleaning portion connected with the accumulating portion, provided with a nozzle that is open to the detection sensor, and configured to eject the liquid water accumulated in the accumulating portion through the nozzle and thereby clean the detection sensor under control of the vehicle controller. The vehicle of this aspect uses water generated in the fuel cell, as a cleaning liquid of the detection sensor. This configuration suppresses the cleaning liquid from becoming insufficient and resulting in insufficient cleaning of the detection sensor. This configuration accordingly reduces the possibility of misdetection due to the dirt of the detection sensor during drive control of the vehicle. Even when the accumulating portion is configured to have a small capacity, this configuration suppresses insufficiency of liquid water as the cleaning liquid. This accordingly allows for downsizing of the accumulating portion and reduces an in-vehicle space for storing the cleaning liquid used to clean the detection sensor.

In the vehicle of the above aspect, the vehicle controller may detect adhesion of a foreign substance to the detection sensor by using the signal output from the detection sensor and may cause the liquid water to be ejected from the nozzle toward the detection sensor when adhesion of the foreign substance is detected. The vehicle of this aspect performs cleaning of the detection sensor when adhesion of a foreign substance to the detection sensor is detected. This configuration thus appropriately reduces the possibility of misdetection due to adhesion of such a foreign substance.

In the vehicle of the above aspect, the vehicle controller may repeatedly perform cleaning of the detection sensor by using the liquid water at predetermined cycles during power generation of the fuel cell and may cause the liquid water that is not yet decreased to ordinary temperature to be discharged from the accumulating portion. The vehicle of this aspect enables the detection sensor to be cleaned by using the liquid water that is discharged from the fuel cell and that is in the state of warm water having the temperature that is not yet decreased to the ordinary temperature. This configuration accordingly enhances the effect of removing a foreign substance, such as oil and grease, adhering to the detection sensor. This configuration also enables a foreign substance such as snow or ice to be readily removed from the detection sensor in a low temperature environment.

In the vehicle of the above aspect, the accumulating portion may include a heat retaining portion configured to keep the liquid water warm. The vehicle of this aspect suppresses a temperature drop of the liquid water that is accumulated in the accumulating portion and that is used for cleaning. This configuration thus enables the detection sensor to be cleaned by using warm water of the higher temperature.

The vehicle of the above aspect may further comprise a compressor configured to feed a compressed gas that is supplied to the fuel cell and that is used for power generation; a gas piping connected with the fuel cell and arranged such that the compressed gas flows in; and a pressure piping connected with the gas piping. The cleaning portion may cause the liquid water to be ejected from the nozzle by a pressure of the compressed gas that is transmitted from the gas piping through the pressure piping. The vehicle of this aspect enables the cleaning liquid to be ejected by using a pressure generated in the compressor that is used to supply a reactive gas to the fuel cell. This configuration is more efficient than a configuration of separately providing a pressure generating source for ejection of the cleaning liquid.

In the vehicle of the above aspect, the cleaning portion may cause the compressed gas supplied through the pressure piping to be ejected from the nozzle, after ejection of the liquid water from the nozzle. The vehicle of this aspect enables a foreign substance such as liquid droplets, adhering to the detection sensor to be removed by ejection of the compressed gas that is supplied to the fuel cell, in addition to cleaning of the detection sensor by using water generated in the fuel cell. This configuration further reduces the possibility of misdetection due to the dirt of the detection sensor.

The vehicle of the above aspect may further comprise a branch piping branched off from the pressure piping. The cleaning portion may include a gas nozzle that is connected with the branch piping and that is configured to eject the compressed gas flowing from the pressure piping into the branch piping, toward the detection sensor. The vehicle of this aspect enables a foreign substance such as liquid droplets, adhering to the detection sensor to be removed by ejection of the compressed gas that is supplied to the fuel cell, in addition to cleaning of the detection sensor by using water generated in the fuel cell. This configuration further reduces the possibility of misdetection due to the dirt of the detection sensor.

In the vehicle of the above aspect, the cleaning portion may further include a window nozzle configured to eject the liquid water toward a window glass of the vehicle. The vehicle of this aspect also enables the window glass to be efficiently cleaned by using water generated in the fuel cell.

According to a second aspect, there is provided a method of cleaning a detection sensor that is mounted on a vehicle and that is used to detect a surrounding condition of the vehicle. The method of this aspect comprises accumulating water generated during power generation of a fuel cell that is mounted on the vehicle, as liquid water; and causing the accumulated liquid water to be ejected toward the detection sensor through a nozzle that is open to the detection sensor. The method of this aspect uses water generated in the fuel cell during drive of the vehicle, as a cleaning liquid of the detection sensor. This configuration suppresses the cleaning liquid from becoming insufficient and resulting in insufficient cleaning of the detection sensor. This configuration accordingly reduces the possibility of misdetection due to the dirt of the detection sensor during drive control of the vehicle. Even when the accumulating portion is configured to have a small capacity, this configuration suppresses insufficiency of liquid water as the cleaning liquid. This accordingly allows for downsizing of the accumulating portion and reduces an in-vehicle space for storing the cleaning liquid used to clean the detection sensor.

The present disclosure may be implemented by any of various aspects other than the aspects of the vehicle and the method of cleaning the detection sensor of the vehicle described above. For example, the present disclosure may be implemented by a drive control system of a vehicle, a fuel cell system, a cleaning system of a detection sensor, control methods thereof, a method of using generated water discharged from a fuel cell, computer programs configured to implement the methods described above, and non-transitory storage media in which such computer programs are stored.

What is claimed is:

1. A vehicle, comprising:
   a detection sensor used to detect a surrounding condition of the vehicle;
   a vehicle controller configured to perform drive control of the vehicle by using a signal output from the detection sensor;
   a fuel cell configured to generate electric power while generating water;
   an accumulating portion configured to accumulate the generated water discharged from the fuel cell therein as liquid water;
   a cleaning portion connected with the accumulating portion, provided with a nozzle that is open to the detection sensor, and configured to eject the liquid water accumulated in the accumulating portion through the nozzle and thereby clean the detection sensor under control of the vehicle controller;
   a compressor configured to feed a compressed gas that is supplied to the fuel cell and that is used for power generation;
   a gas piping connected with the fuel cell and arranged such that the compressed gas flows in; and
   a pressure piping connected with the gas piping, wherein
   the cleaning portion causes the liquid water to be ejected from the nozzle by a pressure of the compressed gas that is transmitted from the gas piping through the pressure piping.

2. The vehicle according to claim 1,
   wherein the vehicle controller detects adhesion of a foreign substance to the detection sensor by using the signal output from the detection sensor and causes the liquid water to be ejected from the nozzle toward the detection sensor when adhesion of the foreign substance is detected.

3. The vehicle according to claim 1,
   wherein the vehicle controller repeatedly performs cleaning of the detection sensor by using the liquid water at predetermined cycles during power generation of the fuel cell and causes the liquid water that is not yet decreased to ordinary temperature to be discharged from the accumulating portion.

4. The vehicle according to claim 1,
   wherein the accumulating portion includes a heat retaining portion configured to keep the liquid water warm.

5. The vehicle according to claim 1,
   wherein the cleaning portion causes the compressed gas supplied through the pressure piping to be ejected from the nozzle, after ejection of the liquid water from the nozzle.

6. The vehicle according to claim 1, further comprising:
a branch piping branched off from the pressure piping, wherein
the cleaning portion includes a gas nozzle that is connected with the branch piping and that is configured to eject the compressed gas flowing from the pressure piping into the branch piping, toward the detection sensor.

7. The vehicle according to claim 1,
wherein the cleaning portion further includes a window nozzle configured to eject the liquid water toward a window glass of the vehicle.

\* \* \* \* \*